(12) United States Patent
Wachi

(10) Patent No.: US 7,613,096 B2
(45) Date of Patent: Nov. 3, 2009

(54) CONVERGING OPTICAL ELEMENT AND OPTICAL PICKUP APPARATUS

(75) Inventor: Mika Wachi, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 652 days.

(21) Appl. No.: 11/153,391

(22) Filed: Jun. 16, 2005

(65) Prior Publication Data

US 2005/0281172 A1    Dec. 22, 2005

(30) Foreign Application Priority Data

Jun. 22, 2004    (JP)    ............... 2004-183986

(51) Int. Cl.
   *G11B 7/00*    (2006.01)
(52) U.S. Cl. .................... 369/112.08; 369/112.06; 369/112.07
(58) Field of Classification Search .............. None
   See application file for complete search history.

(56) References Cited

U.S. PATENT DOCUMENTS

| 2002/0012313 A1 | 1/2002 | Kimura et al. |
| 2003/0185134 A1* | 10/2003 | Kimura et al. ......... 369/112.08 |
| 2004/0042084 A1 | 3/2004 | Ikenaka et al. |
| 2004/0047269 A1 | 3/2004 | Ikenaka et al. |
| 2004/0130804 A1* | 7/2004 | Mimori ...................... 359/719 |
| 2004/0246873 A1* | 12/2004 | Maruyama et al. ..... 369/112.03 |

FOREIGN PATENT DOCUMENTS

| EP | 0 776 004 A2 | 5/1997 |
| EP | 0 874 359 A2 | 10/1998 |
| EP | 1 304 689 A2 | 4/2003 |
| EP | 1 411 506 A2 | 4/2004 |
| JP | 2000-13671 | 1/2000 |
| JP | 2000-348376 | 12/2000 |

* cited by examiner

*Primary Examiner*—Joseph H Feild
*Assistant Examiner*—Joseph Haley
(74) *Attorney, Agent, or Firm*—Finnegan, Henderson, Farabow, Garrett & Dunner, L.L.P.

(57) ABSTRACT

A converging optical element for use in an optical pickup apparatus reproducing and/or recording information on a first optical disc using a first light flux with a wavelength $\lambda 1$ emitted by a first light source, reproducing and/or recording information on a second optical disc using a second light flux with a wavelength $\lambda 2$ emitted by a second light source, and reproducing and/or recording information on a third optical disc using a third light flux with a wavelength $\lambda 3$ emitted by a third light source, the converting optical element includes: a phase structure arranged on at least one surface of the converging optical element, wherein when f3 is a focal length of the converging optical element for the third light flux, the focal length f3 satisfies a predefined condition.

22 Claims, 15 Drawing Sheets

OPTICAL AXIS

OPTICAL AXIS

OPTICAL AXIS

OPTICAL AXIS

OPTICAL AXIS

OPTICAL AXIS

AMOUNT OF OFFENSE AGAINST THE SINE CONDITION IN USING FIRST OPTICAL DISC

AMOUNT OF OFFENSE AGAINST THE SINE CONDITION IN USING SECOND OPTICAL DISC

AMOUNT OF OFFENSE AGAINST THE SINE CONDITION IN USING THIRD OPTICAL DISC

LIGHT SOURCE

RELATIONSHIP BETWEEN THIRD-ORDER COMA GENERATED WHEN OBJECTIVE LENS IS SHIFTED FROM OPTICAL AXIS BY 0.3 mm AND MAGNIFICATION m

CONVERGING OPTICAL ELEMENT AND OPTICAL PICKUP APPARATUS

This application is based on Japanese Patent Application No. 2004-183986 filed on Jun. 22, 2004 in Japanese Patent Office, the entire content of which is hereby incorporated by reference.

FIELD OF THE INVENTION

The present invention relates to a converging optical element used in an optical pickup apparatus and to the optical pickup apparatus.

BACKGROUND OF THE INVENTION

In a field of an optical pickup apparatus, there has recently been an advance of a trend toward a shorter wavelength of a laser source used as a light source for reproducing information recorded on an optical disc, or for recording information on an optical disc, and for example, a laser source having a wavelength of 405 nm such as a violet semiconductor laser and a violet SHG laser wherein a wavelength of a red semiconductor laser is converted by using a second harmonic generation, have lately been put to practical use.

When these violet laser sources are used, information of 15-20 GB can be recorded in an optical disc having a diameter of 12 cm, in the case of using an objective lens with a numerical aperture (NA) identical to that of a digital versatile disc (hereinafter referred to as DVD for short), while, when NA of an objective lens is enhanced to 0.85, information of 23-27 GB can be recorded in an optical disc having a diameter of 12 cm. Hereafter, an optical disc and a magneto-optical disc using a violet laser source are called "a high density optical disc" generically, in the present specification.

As a high density optical disc, there are proposed two standards presently. One of them is Blu-ray disc (hereinafter referred to as BD for short) that uses an objective lens with NA 0.85 and has a 0.1 mm-thick protective layer, and the other is HD DVD (hereinafter referred to as HD for short) that uses an objective lens with NA 0.65-0.67 and has a 0.6 mm-thick protective layer. When considering possibility that high density optical discs of these two standards may circulate in the market in the future, a compatible optical pickup apparatus that can record and reproduce for both high density optical discs stated above as well as a conventional DVD is important, and among them, an optical pickup apparatus of a one-lens type wherein compatibility is attained by an objective lens is most ideal.

Especially, in recent years, development toward commercialization of high density optical discs has become brisk, and its application has been broadened not only to a player for exclusive use for reproducing but also to a recorder capable of recording and one housing therein a personal computer.

In a personal computer of a notebook type, as an application for housing therein a personal computer, a pickup optical system itself needs to be thin for achieving a thin type personal computer, and an optical element with a popular name of a slim type having a short focal length is indispensable for achieving a thin type.

For example, in the technology of three-wavelength compatibility (HD, DVD and CD (compact disc)) including HD, an effect of diffraction provided on the surface of an objective lens is frequently used for compatibility between HD and DVD, and a part of spherical aberration caused by a difference between a protective layer thickness of HD and that of CD is corrected, by making a laser light flux for CD to enter an objective lens as divergent light (for example, presumed by contents of description in Patent Document).

The reason for the light flux for CD to enter as divergent light is that NA of CD is smaller than that of HD or DVD and a wavelength of the light flux is long, and thereby, an amount of spherical aberration generated for CD is the smallest in these three types of optical discs.

(Patent Document 1) TOKKAI No. 2000-348376

SUMMARY OF THE INVENTION

Amount of third order spherical aberration SA3 caused by a difference between a substrate thickness of each of HD and DVD (0.6 mm) and that of CD (approximately. 1.2 mm) is expressed by the following expression;

$$|SA3|=[\Delta t(n\lambda^2-1)/8n\lambda^3] NA^4$$

wherein the symbol $\Delta t$ represents a difference of a protective substrate thickness, $n\lambda$ represents a refractive index of the protective substrate in the case of wavelength $\lambda$.

FIG. 16(a) shows a finite optical system that makes a light flux for CD having substrate thickness t3 to enter an objective lens as divergent light, and converges the light flux on an information recording surface of CD.

As shown in FIG. 16(b), if this optical system is made smaller proportionally as it is to shorten a focal length, and a protective substrate of CD is also made to be thinner proportionally in the same manner, a light flux for CD can naturally be converged on the information recording surface.

However, even when the optical system is made smaller proportionally, the protective substrate thickness of CD remains unchanged to be 1.2 mm, and this causes aberration undesirably in practice. Therefore, even in the case of making the optical system small proportionally as shown in FIG. 16(c), it is necessary to enhance a degree of divergence of a light flux for CD from θ to θ' by changing a magnification, and to correct the aberration mentioned above.

Namely, a magnification of CD in the case of shortening a focal length by miniaturizing the optical system proportionally for the purpose of thinning the optical system needs to be greater than a magnification of CD in the case of an original focal length.

Now, there is caused a problem for such fluctuation of the magnification of CD.

Field angle α for T (mm) representing an amount of tracking of an objective lens can be expressed by the following expression;

$$\tan \alpha = T \times (-m)/[f \times (1-m)^2]$$

wherein f represents a focal length and m represents a magnification of a objective lens.

From this expression, it is understood that field angle a grows greater as magnification m grows greater, when off-axis light enters an objective lens when CD is used or when the objective lens is shifted, and whereby that coma becomes larger as a magnification grows greater.

FIG. 17 is a graph showing the relationship between an amount of third order coma caused in the case of tracking amount T=0.3 mm and magnification m.

For example, in the case of an objective lens with focal length f=3.0 mm which is designed under the conventional technology shown with a broken line, an absolute value of magnification m is 0.03, and wavefront aberration in the case where the objective lens is shifted by 0.3 mm from the optical axis in the course of tracking becomes about 0.013 λrms, to be within a range in which no problem is caused as a use for reproducing and recording.

On the other hand, it is understood that, in the case of an objective lens with focal length f=1.7 mm which is designed under the conventional technology shown with a broken line, an absolute value of magnification m is 0.07, for example, and coma caused in the course of tracking exceeds Marechal's criterion.

An object of the present invention is based on consideration of the aforesaid problems and is to provide a converging optical element and an optical pickup apparatus capable of lightening deterioration of coma caused by tracking, while attaining compatibility for three wavelengths.

To overcome an object stated above, the structure described in Item 1 is a converging optical element for use in an optical pickup apparatus reproducing and/or recording information by using a light flux with wavelength $\lambda 1$ (nm) emitted from the first light source on the first optical disc having a protective substrate with a thickness t1 (mm), reproducing and/or recording information by using a light flux with wavelength $\lambda 2$ (nm) emitted from the second light source on the second optical disc having a protective substrate with a thickness t2 (mm) (t1≦t2), and reproducing and/or recording information by using a light flux with wavelength $\lambda 3$ (nm) emitted from the third light source on the third optical disc having a protective substrate with a thickness t3 (mm) (t1≦t2<t3). The converging optical element includes a phase structure arranged on at least one optical surface of the converging optical element. The thicknesses t1, t2 and t3 satisfy t1≦t2<t3, and, when m3 is an optical system magnification of the converging optical element for an effective light flux which is necessary for recording or reproducing information on the third disc and f3 is a focal length of the converging optical element for the third light flux, the focal length f3 satisfies the following expression (1).

$$0.01 < |m3| \times (t3-t1)/f3 < 0.03 \quad (1)$$

When the optical pickup apparatus is of the structure wherein there are provided three light sources each having a different wavelength of a light flux emitted, and these light fluxes are converged through one objective lens respectively on information recording surfaces of three types of optical discs, optical system magnification m3 in the case of recording and reproducing the third optical disc with substrate thickness t3 is dependent on the focal length. In other words, if focal length f1 of the first optical disc is determined to a specific value, focal length f3 of CD is also determined univocally, and magnification m3 for focal length f3 is also determined univocally.

In the optical pickup apparatus of a thin type of focal length f of about 1.65 mm, for example, when a value of |m3|×(t3−t1)/f3 exceeds an upper limit of the expression (1), a sufficient working distance cannot be realized, and an optical pickup optical system cannot be formed. When focal length f is long (about 2.5 mm), a pickup of a thin type desired cannot be obtained. Therefore, when an range satisfying the expression (1) is kept, it is possible to obtain an optical pickup apparatus capable of conducting recording and reproducing for three types of optical discs each being compact and having a different substrate thickness.

Herein, the diffractive structure described in the present specification may be formed in the whole area of the optical surface on the converging optical element or may be formed in a part of the optical surface of the converging optical element, where the first to third light fluxes pass through (in other words, a common area).

Incidentally, in the present specification, let it be assumed that high density optical discs include also optical discs each having a protective film with a thickness ranging from several nm to several tens nm on an information recording surface and optical discs each having a thickness of 0 (zero) of a protective layer or a protective film, in addition to the aforesaid BD and HD.

Further, in the present specification, the DVD is a general term for optical discs in DVD series such as DVD-ROM, DVE-Vidio, DVD-Audio, DVD-RAM, DVD-R, DVD-RW, DVD+R and DVD+RW, while, the CD is a general term for optical discs in CD series such as CD-ROM, CD-Audio, CD-Video, CD-R and CD-RW.

Further, in the present specification, members such as, for example, an objective lens, a coupling lens, a beam expander, a beam shaper and a correcting plate correspond to the converging optical element.

In addition, the converging optical element is not limited to one composed of only a single lens, but, it may also be a lens group wherein a plurality of lenses are combined in the optical axis direction.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Each of FIG. 4(a)

Each of FIG. 5(a)

Each of FIG. 6(a)

Each of FIG. 7(a)

Each of FIG. 9(a)

Each of FIG. 10(a)

Each of FIG. 12(a)

Each of FIG. 16(a)

DETAILED DESCRIPTION OF THE INVENTION

Figure 1:
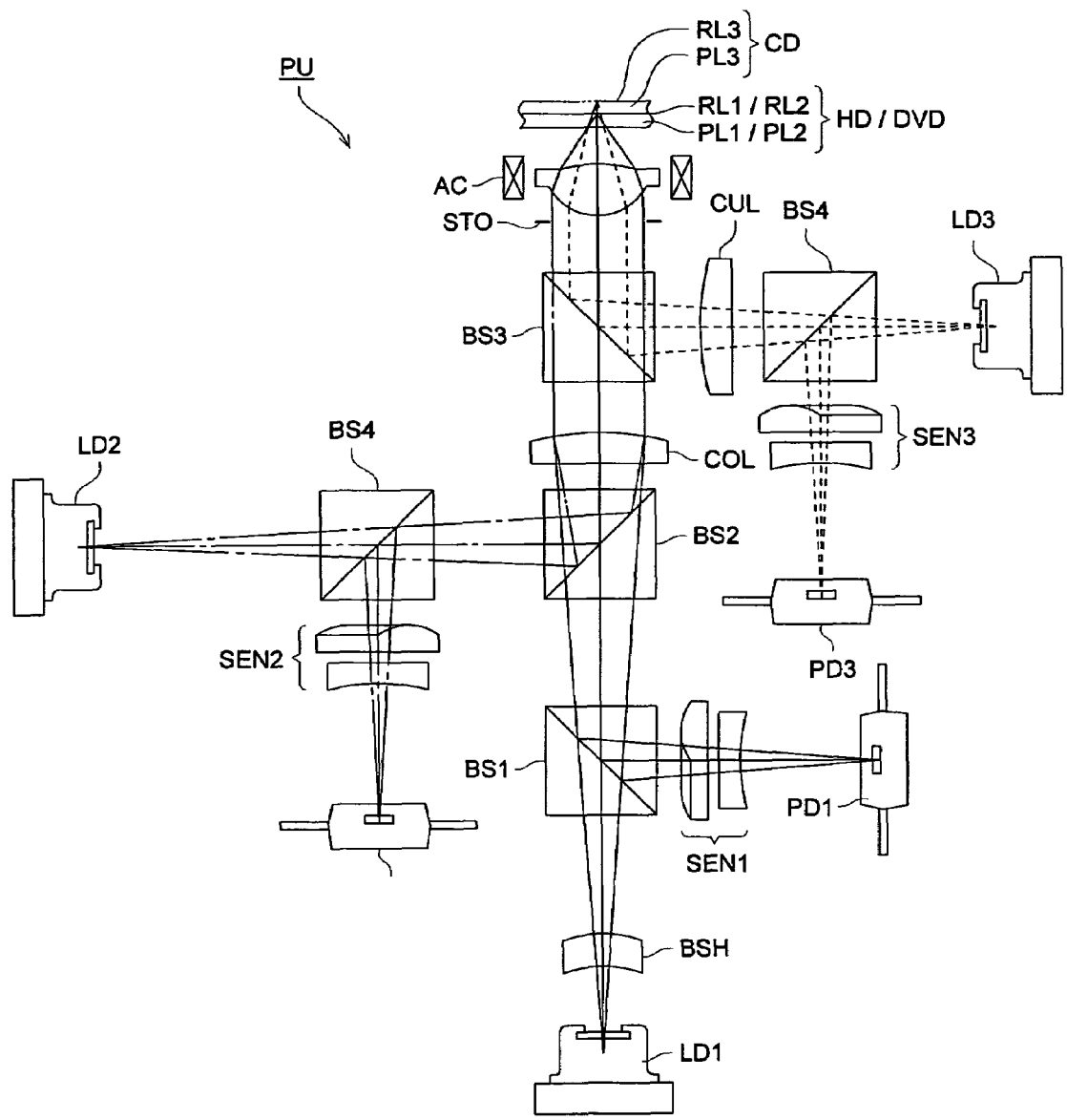
FIG. 1 is a top view of primary portions showing the structure of an optical pickup apparatus.

The structure described in Item 2 is the converging optical element according to Item 1 wherein the converging optical element satisfies the expression (2) where u is an angle between an optical axis and a light flux emitted by one of the first-third light sources and passing through a position which is on a principal plane of the converging optical element and is located away from the optical axis by a distance H in a perpendicular direction to the optical axis, U is an angle between the optical axis and the light flux emitted from an optical surface facing an optical-disc side of the converging optical element, n is a refractive index of an object-side area of the converging optical element, n' is a refractive index of an image-side area of the converging optical element, m is an optical system magnification of the converging optical system for the light flux, f is a focal length of the converging optical system for the light flux, SC is an amount of an offence against sine condition and satisfies following expressions, where SC=n×H/n'×sin U−f for m=0, and SC=f(1−1/m)(sin u/sin U−m) for m≠0, SC1max is a maximum value of the offence against sine condition for converging the first light flux on the first optical disc, and SC3max is a maximum value of the offence against sine condition for converging the third light flux on the first optical disc.

$$0.05 < |SC1\text{max}/SC3\text{max}| < 0.25 \tag{2}$$

If a numerical value of |SC1max/SC3max| is smaller than the lower limit of the expression (2), an amount of offense against sine conditions on the edge portion of the effective diameter of the light flux with wavelength λ3 exceeds 0.07 in terms of an absolute value, and coma in the case of generation of lens shift caused by tracking of a converging optical element with a short focal length, especially of the objective lens exceeds Marechal's criterion. On the other hand, if the aforesaid numerical value is larger than the upper limit, the maximum value of an amount of offense against sine conditions in terms of an absolute value in the case of using a light flux with wavelength λ1 becomes too large, and off-axis characteristics for HD, for example, are worsened.

Thus, by keeping a numerical value of |SC1max/SC3max| to be within a range of the expression (2), it is possible to make an amount of generation of coma in the case of lens shift caused by tracking when using on a finite basis to be Marechal's criterion or less, even when a focal length is sufficiently small, while securing sufficient off-axis characteristics of the first optical disc.

The structure described in Item 3 is the converging optical element according to Item 2 wherein the converging optical element satisfies the following expressions:

$$0.5 \leq NA1 \leq 0.7$$

$$0.4 \leq NA3 \leq 0.64$$

where NA1 represents a numerical aperture of the converging optical element on the image side of the converging optical element for the first light flux, and NA3 represents a numerical aperture of the converging optical element on the image side of the converging optical element for the third light flux.

A structure described in Item 4 is the converging optical element described in any one of Items 1 to 3, wherein each of an optical surface facing a light-source side and an optical surface facing an optical-disc side of the converging optical element is divided into a plurality of areas which are arranged concentrically around the optical axis, the plurality of areas include a first area being on the optical surface facing the light-source side including an optical axis, a second area arranged outside of the first area, a third area being on the optical surface facing the optical-disc side and including an optical axis, and a fourth area arranged outside of the third area. The first area and the third area transmit the first to third light fluxes for reproducing and/or recording information on the first to third optical discs respectively, the second area and the fourth area transmit the first and second light fluxes for reproducing and/or recording information on the first and second optical discs respectively, and the converging optical element satisfies the expression (3) where 1Rr1 is a curvature radius of the first area, 1Rr2 is a curvature radius of the second area, 2Rr1 is a curvature radius of the third area, and 2Rr2 is a curvature radius of the fourth area.

$$0.5 \leq (1Rr2-2Rr2)/(1Rr1-2Rr1) \leq 1.5 \tag{3}$$

The expression (3) shows that an inside radius of curvature (1Rr1 and 2Rr1) is different from an outside radius of curvature (1Rr2 and 2Rr2) within a range that does not fall below the lower limit value 0.5, regarding the converging optical element with a short focal length whose optical surface is divided into plural areas. When the lower limit value is exceeded, it means that a paraxial radius of an outside area of the converging optical element on at least one of the light source side and the disc side, and when the paraxial radius is small, influences of off-axis characteristics and of eccentricity errors on the lens surface in manufacture grow greater.

Incidentally, let it be assumed that a range of the expression (3) does not include 1. The reason for the above is that a paraxial radius of curvature of the inside area needs to be different from that of the outside area.

When a value of (1Rr2−2Rr2)/(1Rr1−2Rr1) is made to be within a range of the expression (3) as stated above, it is possible to prescribe a surface form of the optical surface capable of correcting also off-axis aberration while correcting spherical aberration for three wavelength types. The foregoing makes it possible to prevent that a radius of curvature of an aspheric surface on an inside area is considerably different from that on an outside area.

If a paraxial radius of curvature of the outside area is small, aberration is caused when relative surface shifting takes place in the course of injection molding manufacturing. However, if the radius of curvature is within this range, an amount of occurrence of aberration can be controlled sufficiently in the converging optical element.

A structure described in Item 5 is the converging optical element described in Item 4, wherein a height h of the first area from the optical axis is a height of an effective light flux diameter which is necessary for forming a converged spot on an information recording surface on the third optical disc.

A structure described in Item 6 is the converging optical element described in either one of Items 1-5, wherein the converging optical element satisfies the following expression (4) where SCmax represents an amount of offence against the sine condition on the edge portion of an effective diameter of the converging optical element when the pickup apparatus reproduces and/or records information on the third disc using an finite conjugated system and f is a focal length of the converging optical system for a light flux emitted by one of the first to third light sources and passing through a position which is on a principal plane of the converging optical element and is located away from the optical axis by a distance H in a perpendicular direction to the optical axis.

$$0.03 < |SC\text{max}|/f < 0.05 \tag{4}$$

Circumstances that a value of |SCmax| is smaller than the lower limit value 0.03 include a reason that focal length f is large or an absolute value of SCmax is small, but it is preferable that a focal length of an objective lens is about 1.8-2.3 mm and it is especially preferable that a focal length of an objective lens is about 1.8-2.0 mm, for incorporating the objective lens in an optical pickup apparatus of a thin type. Further, if a value of SCmax in a finite conjugated system is regulated to be small, attainment of compatibility for three-types of optical discs is in doubt, because sine conditions of other optical discs (for example, HD and DVD) are not satisfied.

Circumstances that a value of |SCmax| is larger than the upper limit value 0.05 include a reason that focal length f is small or SCmax is large, but if a focal length is too small (for example, f=1.6 or less), a sufficient working distance cannot be secured, and if SCmax is too large, coma caused by occurrence of lens shift originating from tracking in a finite conjugated system cannot be controlled, which are troubles.

To attain the structure of an optical pickup apparatus of a thin type, it is preferable to use a converging optical element whose focal length f is 1.8-2.0 mm, and to control generation of coma caused by lens shift in a finite conjugated system, it is necessary to make SCmax small by controlling an amount of offence against the sine condition as the focal length becomes shorter. The expression (4) shows relationship between focal length f and |SCmax|, and if an amount of offence against the sine condition is in a numerical value range of the expression (4), a converging optical element for an optical pickup apparatus of a thin type which can be used for recording and reproducing for three wavelengths and is assured in terms of off-axis characteristics.

The structure described in Item 7 is the converging optical element according to any one of Items 1-6, wherein the converging optical element is formed of a single lens.

A structure described in Item 8 is the converging optical element described in either one of Items 1-7, wherein the converging optical element satisfies $1.8 \leq f \leq 2.3$, wherein f (mm) is a focal length of the converging optical element for a light flux emitted by one of the first to third light sources.

A structure described in Item 9 is the converging optical element described in Item 8, wherein the converging optical element satisfies $1.8 \leq f \leq 2.0$.

A structure described in Item 10 is the converging optical element described in either one of Items 1-9, wherein the converging optical element satisfies $0.035 \leq |m3| \leq 0.066$.

A structure described in Item 11 is the converging optical element described in either one of Items 1-10, wherein the converging optical element satisfies following expressions:

$$1.5 \times \lambda 1 \leq \lambda 2 \leq 1.7 \times \lambda 1$$

$$1.8 \times \lambda 1 \leq \lambda 3 \leq 2.2 \times \lambda 1.$$

A structure described in Item 12 is the converging optical element described in either one of Items 1-11, wherein the converging optical element satisfies following expressions:

$$0.9 \times t1 \leq t2 \leq 1.1 \times t1$$

$$1.9 \times t1 \leq t3 \leq 2.1 \times t1.$$

A structure described in Item 13 is an optical pickup apparatus for information recording and/or reproducing including: a first light source for emitting a first light flux with a wavelength $\lambda 1$ (nm) for recording and/or reproducing information on a first optical disc having a protective substrate with a thickness t1 (mm); a second light source for emitting a second light flux with a wavelength $\lambda 2$ (nm) for recording and/or reproducing information on a second optical disc having a protective substrate with a thickness t2 (mm); a third light source for emitting a third light flux with a wavelength $\lambda 3$ (nm) for recording and/or reproducing information on a third optical disc having a protective substrate with a thickness t3 (mm); and a converging optical element having a phase structure arranged on at least one surface of the converging optical element, for converging the first light flux, the second light flux and the third light flux on the first disc, the second disc and the third disc, respectively. The thicknesses t1, t2 and t3 satisfy $t1 \leq t2 < t3$, and when m3 is an optical system magnification of the converging optical element for an effective light flux which is necessary for recording or reproducing information on the third disc and f3 is a focal length of the converging optical element for the third light flux, the focal length f3 satisfies $0.01 < |m3| \times (t3-t1)/f3 < 0.03$.

The structure described in Item 14 is the optical pickup apparatus according to Item 13, wherein the optical pickup apparatussatisfies $$0.05 \leq |SC1\,max/SC3\,max| \leq 0.25$$

where u is an angle between an optical axis and a light flux emitted by one of the first-third light sources and passing through a position which is on a principal plane of the converging optical element and is located away from the optical axis by a distance H in a perpendicular direction to the optical axis, U is an angle between the optical axis and the light flux emitted from an optical surface facing an optical-disc side of the converging optical element, n is a refractive index of an object-side area of the converging optical element, n' is a refractive index of an image-side area of the converging optical element, m is an optical system magnification of the converging optical system for the light flux, f is a focal length of the converging optical system for the light flux, SC is an amount of an offence against sine condition and satisfies following expressions, where $SC = n \times H/n' \times \sin U - f$ for $m=0$, and $$SC = f(1-1/m)(\sin u/\sin U - m) \text{ for } m \neq 0,$$

SC1max is a maximum value of the offence against sine condition for converging the first light flux on the first optical disc, and SC3max is a maximum value of the offence against sine condition for converging the third light flux on the first optical disc.

The structure described in Item 15 is the optical pickup apparatus according to Item 14, wherein the optical pickup apparatus satisfies the following expressions:

$$0.5 \leq NA1 \leq 0.7$$

$$0.4 \leq NA3 \leq 0.64$$

where NA1 is a numerical aperture of an image side of the converging optical element for the first light flux, and NA3 is a numerical aperture of an image side of the converging optical element for the third light flux.

A structure described in Item 16 is the optical pickup apparatus described in any one of Items 13 to 15, wherein each of an optical surface facing a light-source side and an optical surface facing an optical-disc side of the converging optical element is divided into a plurality of areas which are arranged concentrically around the optical axis. The plurality of areas include a first area being on the optical surface facing the light-source side and including an optical axis, a second area arranged outside of the first area, a third area being on the optical surface facing the optical-disc side and including an optical axis, and a fourth area arranged outside of the third area, the first area and the third area transmit the first to third light fluxes for reproducing or recording information on the first to third optical discs respectively. The second area and the fourth area transmit the first and second light fluxes for reproducing and/or recording information on the first and second optical discs respectively, and the optical pickup apparatus satisfies $$0.5 \leq (1Rr2-2Rr2)/(1Rr1-2Rr1) \leq 1.5,$$

where 1Rr1 is a curvature radius of the first area, 1Rr2 is a curvature radius of the second area, 2Rr1 is a curvature radius of the third area, and 2Rr2 is a curvature radius of the fourth area.

A structure described in Item 17 is the optical pickup apparatus described in Item 16, wherein a height h of the first area of the converging optical element from the optical axis is a height of an effective light flux diameter which is necessary for forming a converged spot on an information recording surface on the third optical disc.

The structure described in Item 18 is the optical pickup apparatus according to any one of Items 13 to 17, wherein the optical pickup apparatus satisfies $$0.03 \leq |SCmax|/f \leq 0.05$$

where SCmax is an amount of an offence against sine condition on an edge of an effective diameter of the converging optical element when the pickup apparatus reproduces or records information on the third disc using an finite conjugated system and f is a focal length of the converging optical system for a light flux emitted by one of the first to third light sources and passing through a position which is on a principal plane of the converging optical element and is located away from the optical axis by a distance H in a perpendicular direction to the optical axis.

A structure described in Item 19 is the optical pickup apparatus described in either one of Items 13-18, wherein the converging optical element is formed of a single lens.

A structure described in Item 20 is the optical pickup apparatus described in either one of Items 13-19, wherein the optical pickup apparatus satisfies $1.8 \leq f \leq 2.3$, wherein f (mm) is a focal length of the converging optical element for a light flux emitted by one of the first to third light sources.

A structure described in Item 21 is the optical pickup apparatus described in either one of Items 13-20, wherein the optical pickup apparatus satisfies $1.8 \leq f \leq 2.0$.

A structure described in Item 22 is the optical pickup apparatus described in either one of Items 13-21, wherein the optical pickup apparatus satisfies $$0.035 \leq |m3| \leq 0.066.$$

A structure described in Item 23 is the optical pickup apparatus described in either one of Items 13-22, wherein the optical pickup apparatus satisfies following expressions:

$$1.5 \times \lambda 1 \leq \lambda 2 \leq 1.7 \times \lambda 1$$

$$1.8 \times \lambda 1 \leq \lambda 3 \leq 2.2 \times \lambda 1.$$

A structure described in Item 24 is the optical pickup apparatus described in either one of Items 13-23, wherein the optical pickup apparatus satisfies following expressions:

$$0.9 \times t1 \leq t2 \leq 1.1 \times t1$$

$$1.9 \times t1 \leq t3 \leq 2.1 \times t1.$$

The invention makes it possible to obtain a converging optical element and an optical pickup apparatus wherein compatibility for three wavelengths is attained, and deterioration of coma caused by tracking can be reduced.

The preferred embodiment for practicing the invention will be explained in detail as follows, referring to the drawings.

FIG. 1 is a diagram showing schematically the structure of optical pickup apparatus PU capable of conducting recording and reproducing of information properly for any of HD (first optical disc), DVD (second optical disc) and CD (third optical disc), Optical specifications of HD include wavelength $\lambda 1$=407 nm, protective layer (protective substrate) PL1 thickness t1=0.6 mm and numerical aperture NA1=0.65, optical specifications of DVD include wavelength $\lambda 2$=655 nm, protective layer PL2 thickness t2=0.6 mm and numerical aperture NA2=0.65, and optical specifications of CD include wavelength $\lambda 3$=785 nm, protective layer PL3 thickness t3=1.2 mm and numerical aperture NA3=0.51.

However, the combination of a wavelength, a protective layer thickness and a numerical aperture is not limited to the foregoing.

Further, optical system magnification m1 of objective lens OBJ (converging optical element) in the case of conducting recording and/or reproducing of information for the first optical disc, is zero. Namely, in the structure of the objective lens OBJ in the present embodiment, the first light flux with wavelength $\lambda 1$ enters the objective lens OBJ as parallel light.

Further, optical system magnification m2 of objective lens OBJ in the case of conducting recording and/or reproducing of information for the second optical disc, is also zero in the same way. Namely, in the structure of the objective lens OBJ in the present embodiment, the second light flux with wavelength $\lambda 2$ enters the objective lens OBJ as parallel light.

Incidentally, in the invention, it is not always necessary that both of first magnification m1 and second magnification m2 are zero, and it is also possible to make the second light flux to enter as parallel light, for example, or to make the first light flux to enter objective lens OBJ as slightly-converged light, or to make both of the first light flux and the second light flux to enter as slightly-converged light.

Further, optical system magnification m3 of objective lens OBJ in the case of conducting recording and/or reproducing of information for the third optical disc satisfies m3<0. Namely, the objective lens OBJ in the present embodiment has the structure wherein the third light flux with wavelength $\lambda 3$ enters the objective lens as divergent light.

Optical pickup apparatus PU is composed of violet semi-conductor laser LD1 (first light source) emitting a laser light flux (first light flux) that is emitted in the case of conducting recording and reproducing of information for HD and has a wavelength of 407 nm, red semiconductor laser LD2 (second light source) emitting a laser light flux (second light flux) that is emitted in the case of conducting recording and reproducing of information for DVD and has a wavelength of 655 nm, photo-detector PD2 for the second light flux, infra-red semi-conductor laser LD3 (third light source) emitting a laser light flux (third light flux) that is emitted in the case of conducting recording and reproducing of information for CD and has a wavelength of 785 nm, photo-detector PD3 for the third light flux, collimator lens COL through which the first light flux and the second light flux pass, coupling lens CUL through which the third light flux passes, double-sided aspheric objective lens OBJ that has a diffractive structure formed on its optical surface, and has a function to converge respective light fluxes on information recording surfaces RL1, RL2 and RL3 respectively, biaxial actuator AC that moves the objective lens OBJ in the prescribed direction, first-fifth beam splitter BS1-BS5, beam shaper BSH, diaphragm STO and sensor lenses SEN1-SEN3.

When conducting recording and reproducing of information for HD, in optical pickup apparatus PU, violet semiconductor laser LD1 is first made to emit light as its light path is drawn with solid lines in FIG. 1. A divergent light flux emitted from the violet semiconductor laser LD1 is changed in terms of a form of its section when it passes through beam shaper BSH, then, it passes through the first beam splitter BS1 and the second beam splitter BS2 and arrives at collimator lens COL.

When passing through the collimator lens COL, the first light flux is converted into a collimated light, then, it passes through the third beam splitter BS3 and the diaphragm STO to arrive at the objective lens OBj, and becomes a spot formed by the objective lens OBj on information recording surface RL1 through first protective layer PL1. Biaxial actuator AC arranged on the circumference of the objective lens OBj makes the objective lens OBj to conduct focusing and tracking.

A reflected light flux modulated by information pits on information recording surface RL1 passes again through the objective lens OBJ, third beam splitter BS3, collimator lens COL and second beam splitter BS2, then, is branched by the first beam splitter BS1, and is given astigmatism by sensor lens SEN1, to be converged on a light-receiving surface of photo-detector PD1. Thus, information recorded on HD can be read by using output signals of the photo-detector PD1.

Further, when conducting recording and reproducing of information for DVD, red semiconductor laser LD2 is first made to emit light as its light path is drawn with one-dot chain lines in FIG. 1. A divergent light flux emitted from the red semiconductor laser LD2 passes through fourth beam splitter BS4, and is reflected on the second beam splitter BS2 to arrive at collimator lens COL.

When passing through the collimator lens COL, the second light flux is converted into a collimated light, then, it passes through the third beam splitter BS3 and the diaphragm STO to arrive at the objective lens OBJ, and becomes a spot formed by the objective lens OBJ on information recording surface RL2 through second protective layer PL2. Biaxial actuator AC arranged on the circumference of the objective lens OBJ makes the objective lens OBJ to conduct focusing and tracking.

A reflected light flux modulated by information pits on information recording surface RL2 passes again through the objective lens OBJ, third beam splitter BS3 and collimator lens COL, then, is branched by second beam splitter BS2 and is further branched by the fourth beam splitter BS4, and is given astigmatism by sensor lens SEN2, to be converged on a light-receiving surface of photo-detector PD2. Thus, information recorded on DVD can be read by using output signals of the photo-detector PD2.

Further, when conducting recording and reproducing of information for CD, infra-red semiconductor laser LD3 is first made to emit light as its light path is drawn with dotted lines in FIG. 1. A divergent light flux emitted from the infrared semiconductor laser LD3 passes through fifth beam splitter BS5, and arrive at coupling lens CUL.

When passing through the coupling lens CUL, the third light flux is changed in terms of an angle of divergence, then, it is reflected by third beam splitter BS3, and it passes through the diaphragm STO to arrive at the objective lens OBJ, and becomes a spot formed by the objective lens OBJ on information recording surface RL3 through third protective layer PL3. Biaxial actuator AC arranged on the circumference of the objective lens OBJ makes the objective lens OBJ to conduct focusing and tracking.

A reflected light flux modulated by information pits on information recording surface RL3 passes again through the objective lens OBJ, then, is reflected by third beam splitter BS23 and passes through coupling lens CUL, then, is branched by fifth beam splitter BS5 and is given astigmatism by sensor lens SEN3, to be converged on a light-receiving surface of photo-detector PD3. Thus, information recorded on CD can be read by using output signals of the photo-detector PD3.

Next, the structure of objective lens OBJ will be explained.

Figure 2:
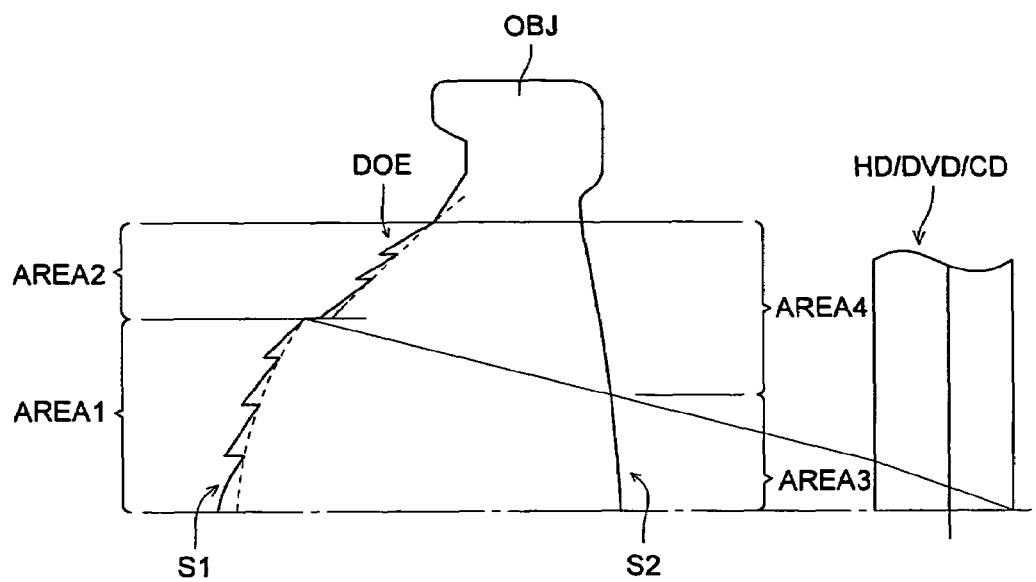
FIG. 2 is a sectional view of primary portions showing the structure of an objective lens.

As shown in FIG. 2, the objective lens OBJ is a plastic single lens whose plane of incidence S1 (optical surface facing the light source side) and plane of emergence S2 (optical surface facing the optical disc side) are of an aspheric surface.

Figure 3:
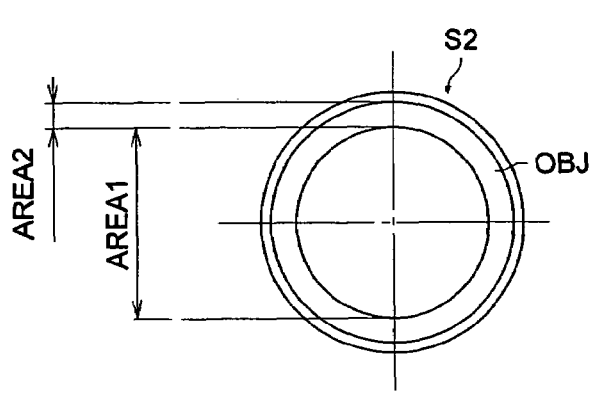
FIG. 3(a) and FIG. 3(b) are respectively a front view and a rear elevation each showing the structure of an objective lens.
Figure 3:
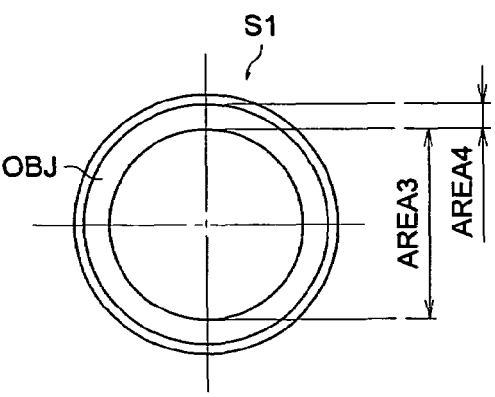
Figure 4:
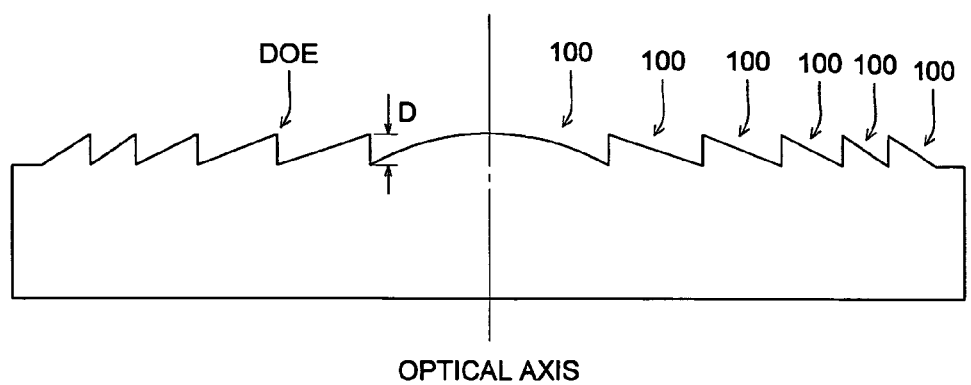
FIG. 4(b) is a side view showing an example of a phase structure.
Figure 4:
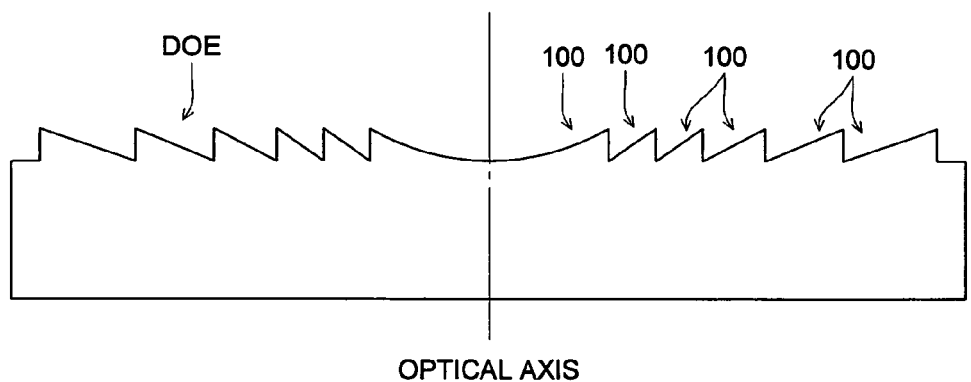
Figure 5:
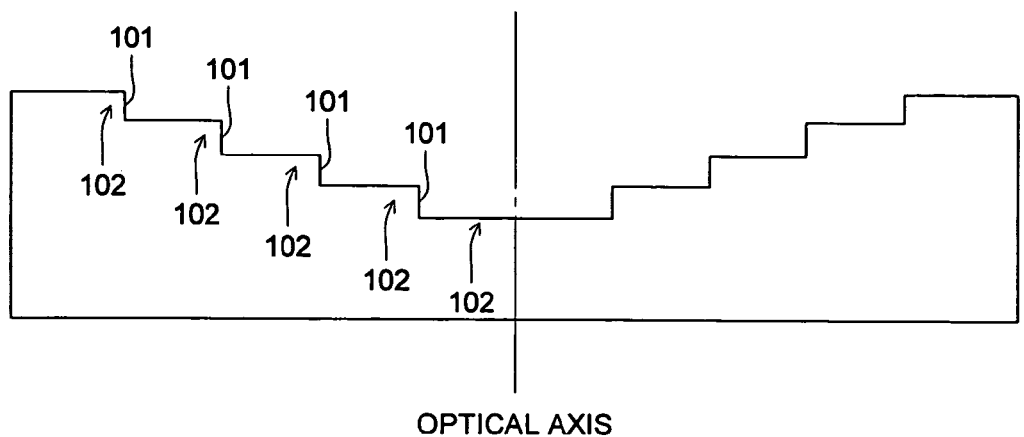
FIG. 5(b) is a side view showing an example of a phase structure.
Figure 5:
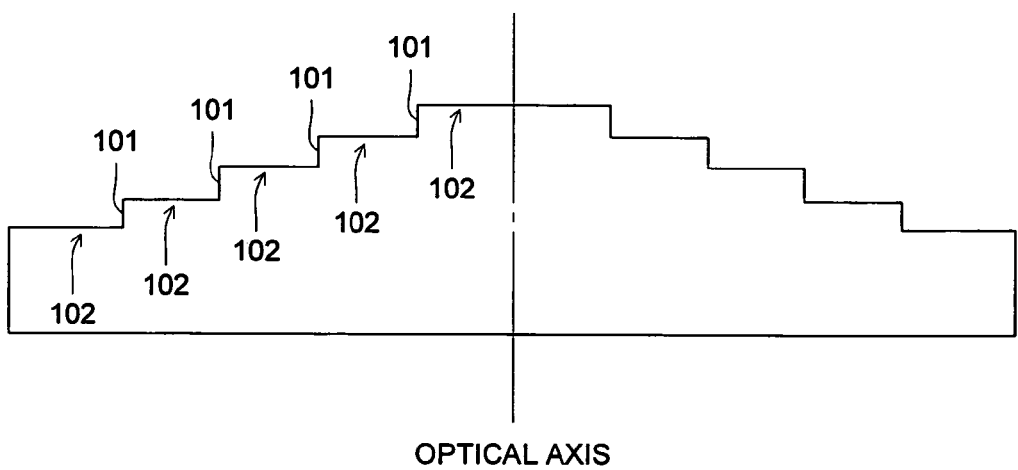
Figure 6:
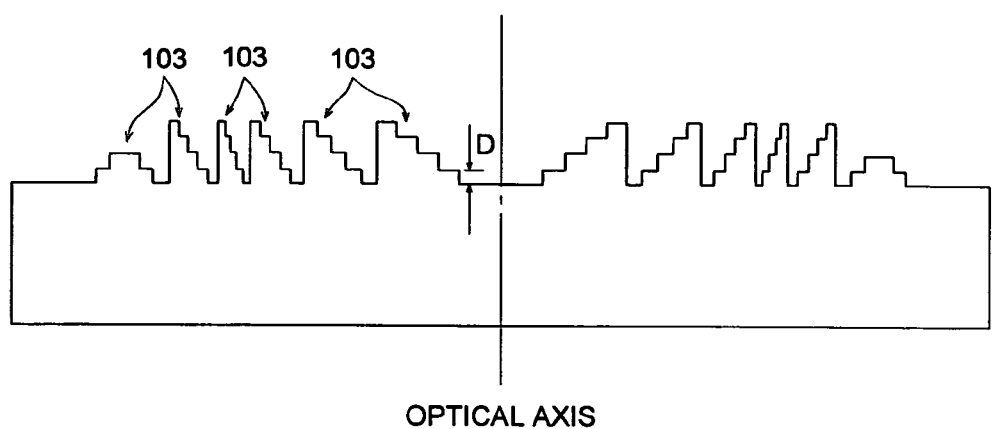
FIG. 6(b) is a side view showing an example of a phase structure.
Figure 6:
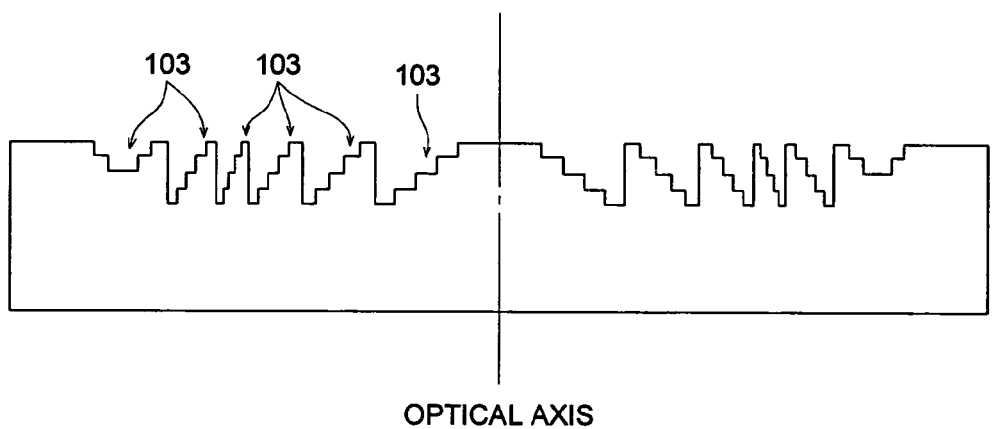

As shown in FIG. 3(a), optical surface S1 of the objective lens is divided into first area AREA1 including an optical axis corresponding to an area in NA3, and into second area AREA2 corresponding to an area from NA3 to NA1. On each of the first area AREA1 and the second area AREA2, there is formed diffractive structure DOE whose section including an optical axis is serrated and whose structure is of plural ring-shaped zones in a form of concentric circles each having its center on an optical axis.

Optical surface S2 of the objective lens is also divided into third area AREA3 including an optical axis corresponding to an area in NA3, and into fourth area AREA4 corresponding to an area from NA3 to NA1, as shown in FIG. 3(b). Each of the third AREA3 and the fourth area AREA4 is composed of refracting interfaces.

Figure 7:
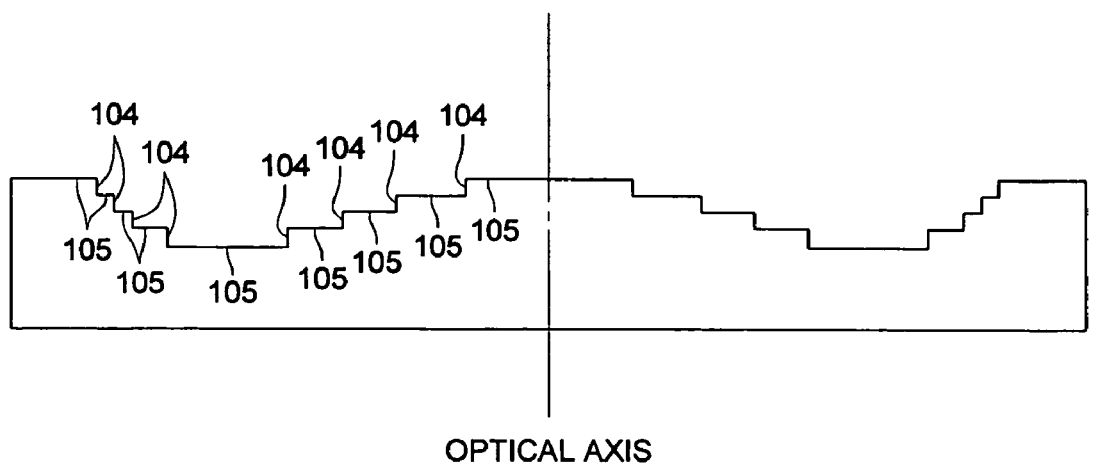
FIG. 7(b) is a side view showing an example of a phase structure.
Figure 7:
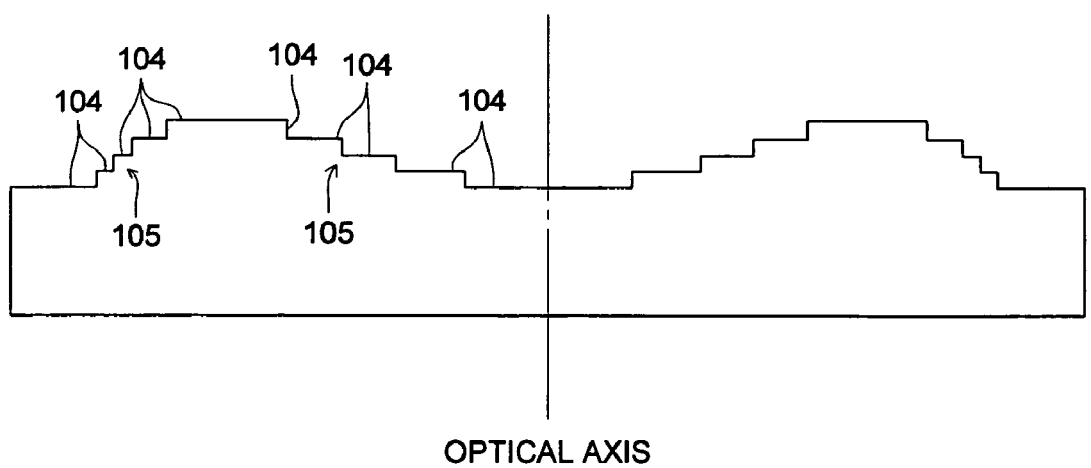

A phase structure to be formed on an optical surface of objective lens OBJ may be either a diffractive structure or an optical path difference providing structure. The diffractive structure includes a structure wherein a plurality of ring-shaped zones 100 are constituents, and a section of the structure including an optical axis is indented as shown schematically in FIGS. 4(a) and 4(b), a structure wherein its constituents are a plurality of ring-shaped zones 102 whose steps 101 are the same in terms of direction within an effective diameter, and a section of the structure including an optical axis is in a form of stairs as shown schematically in FIGS. 5(a) and 5(b), a structure which is composed of a plurality of ring-shaped zones 103 in which a structure of stairs is formed as shown schematically in FIGS. 6(a) and 6(b), and a structure wherein its constituents are a plurality of ring-shaped zones 105 in which a direction of steps 104 is changed on the halfway of an effective diameter, and a section of the structure including an optical axis is in a form of stairs as shown schematically in FIGS. 7(a) and 7(b). The optical path difference providing structure, on the other hand, includes a structure wherein its constituents are a plurality of ring-shaped zones 105 in which a direction of steps 104 is changed on the halfway of an effective diameter, and a section of the structure including an optical axis is in a form of stairs as shown schematically in FIGS. 7(a) and 7(b). Therefore, the structure shown schematically in FIGS. 7(a) and 7(b) is the diffractive structure or the optical path difference providing structure, depending on circumstances. Incidentally, though each of FIG. 4(a)-FIG. 7(b) shows schematically an occasion where each of the phase structure is formed on a plane, it is also possible to form each phase structure on a spherical surface or on an aspheric surface. Incidentally, in the present specification, let it be assumed that a symbol "DOE" represents a diffractive structure composed of plural ring-shaped zones such as those shown in FIGS. 4(a), 4(b), 5(a), 5(b), 7(a) and 7(b), and a symbol "HOE" represents a diffractive structure composed of plural ring-shaped zones in which a structure of stairs is formed such as those shown in FIGS. 6(a) and 6(b).

By providing the phase structure of this kind, spherical aberration caused by wavelength changes of a semiconductor laser resulting from temperature changes can be controlled, for example, and spherical aberration caused by a semiconductor laser whose oscillation wavelength is shifted from the standard wavelength by manufacturing errors can be controlled, or excellent recording and reproducing characteristics can be maintained even in the case when a wavelength of an incident light flux is changed instantly.

By utilizing a phase structure provided on objective lens OBJ, it is possible to correct chromatic aberration caused by a wavelength difference between the first light flux with wavelength λ1 for HD and the second light flux with wavelength λ2 for DVD and/or to correct spherical aberration caused by a thickness difference between a protective layer of HD and that of DVD. Incidentally, the chromatic aberration mentioned here means a minimum position fluctuation of wavefront aberration in the optical direction caused by a wavelength difference. For example, by making a phase structure to be a diffractive structure that gives a positive diffracting function for at least one of light fluxes having respectively wavelength λ1 and wavelength λ2, chromatic aberration caused by wavelength fluctuations of the light flux given a diffracting function can be controlled.

The objective lens in the present embodiment is established to satisfy the following expression (1) by using focal length f3, optical system magnification m3, protective layer thickness t1 of HD and protective layer thickness t3 of CD, all of objective lens OBJ for a light flux with wavelength λ3.

$$0.01 < |m3| \times (t3-t1)/f3 < 0.03 \quad (1)$$

When three types of light sources each emitting a light flux with different wavelength are provided as in optical pickup apparatus PU relating to the invention, and when these light fluxes are converged respectively on information recording surfaces of three types of optical discs through one optical disc OBJ, optical system magnification m3 for conducting recording and reproducing for CD with substrate thickness t3 depends on a focal length. In other words, if focal length f1 of HD is determined to a specific value, focal length f3 of CD is determined univocally, and magnification m3 at focal length f3 is further determined univocally.

Figure 8:
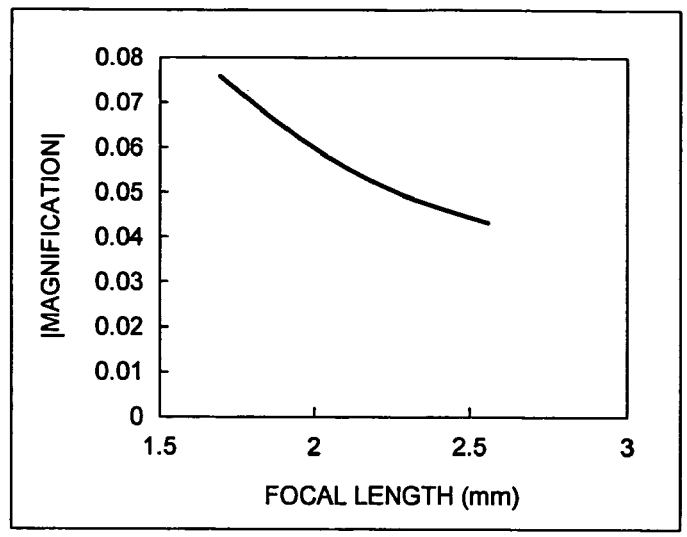
FIG. 8 is a graph showing the relationship between a focal length and a magnification.

Table 5 and FIG. 8 represent a table and a graph showing relationships between a focal length and magnification m in the occasion infinite light enters an objective lens when conducting recording and reproducing for two optical discs (HD and DVD), and finite light enters the objective lens for correcting spherical aberration caused by substrate thickness difference (t3−t1 or t3−t2) when conducting recording and reproducing for remaining one optical disc (CD) in an optical pickup system including a light source (first light source) with wavelength 390 nm-420 nm.

When a value of |m3|×(t3−t1)/f3 exceeds the upper limit of expression (1) in a thin-type optical pickup apparatus having focal length f about 1.65 mm, it is impossible to have sufficient working distance WD, and a pickup optical system is not materialized. When focal length f is long (to be about 2.5 mm), a thin-type pickup cannot be obtained. Therefore, when a range satisfying expression (1) is kept, an optical pickup apparatus which is compact in size and is capable of conducting recording and reproducing for three types of optical discs each having a different substrate thickness can be obtained.

TABLE 5

| | Focal length for CD | | | | |
|---|---|---|---|---|---|
| | 2.54 | 2.34 | 2.04 | 1.84 | 1.69 |
| Absolute value of magnification for CD | 0.043 | 0.049 | 0.056 | 0.069 | 0.075 |
| Substrate thickness difference (t3 − t1) | | | 0.6 | | |
| |m3| × (t3 − t1)/f3 | 0.0103 | 0.0125 | 0.0165 | 0.0226 | 0.0266 |

Further, the following expression (2) is established to be satisfied when u represents an angle between an optical axis and an light flux that is emitted from one of the first-third light sources and passes through the point that is on a principal plane of an objective lens and is away from the optical axis by a distance H in the direction perpendicular to the optical axis, U represents an angle between the optical axis and the light flux which has emerged from the optical surface facing an optical disc side of the objective lens, n represents the refractive index of the optical surface closer to the light source on the objective lens, in other words, represents a refractive index of an object-side area of the converging optical element, n' represents the refractive index of the optical surface closer to the optical disc on the objective lens, in other words, represents a refractive index of an image-side area of the converging optical element, m represents an optical system magnification of the objective lens for the aforesaid light flux, f represents a focal length of the objective lens for the aforesaid light flux, SC represents an amount of offence against the sine condition, SC1max represents a maximum value of an amount of offence against the sine condition for converging the light flux with wavelength λ1 on HD, and SC3max represents a maximum value of an amount of offence against the sine condition at an outer edge of an effective diameter of the objective lens for converging the light flux with wavelength λ3 on CD;

$$0.05 < |SC1\,max/SC3\,max| < 0.25 \quad (2)$$

wherein SC=n×H/n'×sin U−f when m is equal to 0 and SC=f (1−1/m)(sin u/sin U−m) when m is not equal to 0.

Figure 9:
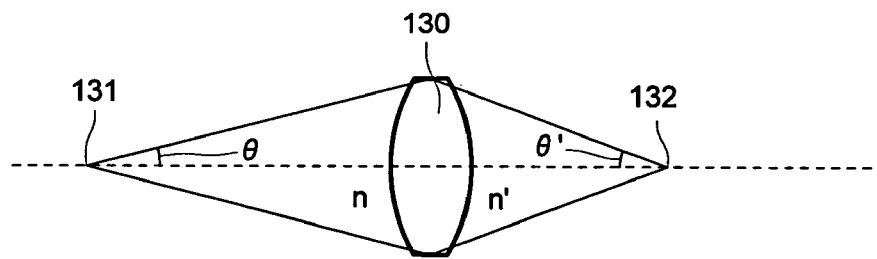
FIG. 9(b) is a diagram illustrating sine conditions.
Figure 9:
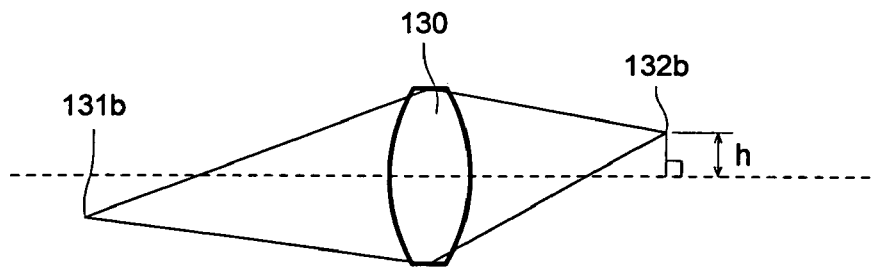

FIGS. 9(*a*) and 9(*b*) are illustrations for explaining sine conditions. In the case of FIG. 9(*a*), light generated from paraxial object point 131 is converged by lens 130 on paraxial image point 132 to be an image. Now, the lens 130 is assumed to be aberration-free for simplification of illustration (no spherical aberration under this condition). When β represents the paraxial lateral magnification of the lens 130, amount of offence against the sine condition SC is given by the following expression;

$$SC = (n \times \sin \theta)/(n' \times \sin \theta') - \beta$$

wherein, n represents the refractive index on the object point side, and n' represents the refractive index on the image point side.

FIG. 9(*b*) shows an occasion where object point 131*b* is outside an axis, and in this case, object point 132*b* is also outside an axis. Since this image forming relationship is one between off-axis conjugate points, aberration is generated even if lens 130 is the so-called aberration-free lens, in which, however, an extent of the generation of aberration depends on how sine conditions are satisfied by the lens 130.

Figure 10:
FIG. 10(b) is a graph showing the relationship between an image height and an amount of aberration.
Figure 10:
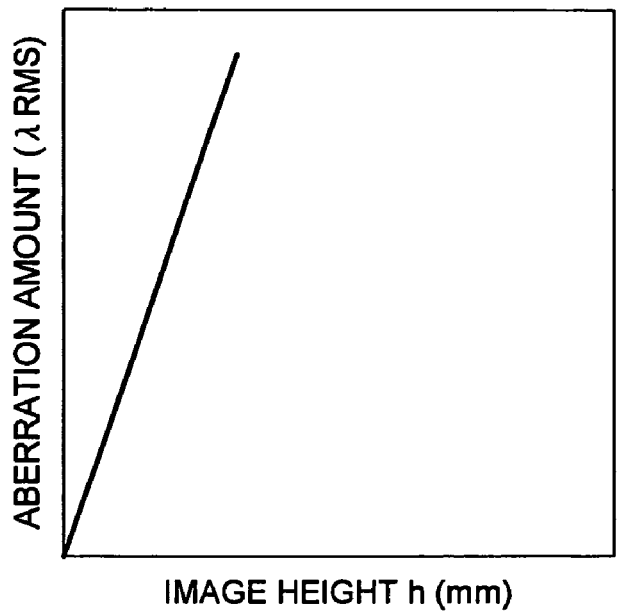

If the sine conditions are satisfied by the lens 130 in this case, the relationship between image height h and an amount of aberration turns out to be one shown in FIG. 10(*a*). In this case, most of aberrations generated are astigmatism, and no coma is generated. On the other hand, when the lens 130 is deviated from the sine conditions, the relationship between image height h and an amount of aberration turns out to be one shown in FIG. 10(b). In this case, an amount of aberration is much greater than that in the case where sine conditions are satisfied, because both astigmatism and coma are generated simultaneously. In other words, when light enters the lens frontally correctly, an image forming characteristic in the case where sine conditions are satisfied is the same as that in the case where sine conditions are not satisfied, but when light enters the lens obliquely, image forming characteristics (off-axis characteristics) are quite different each other, thereby, most optical systems are designed usually so that they satisfy sine conditions.

Figure 11:
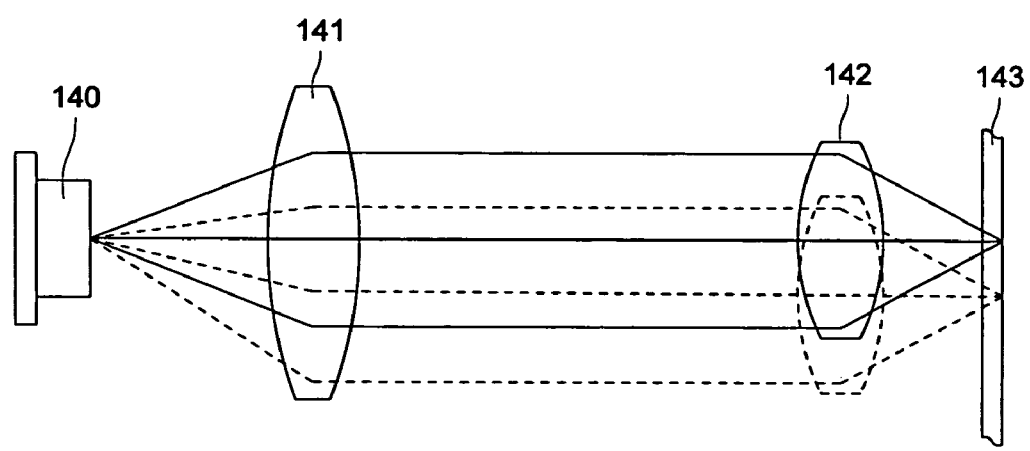
FIG. 11(a) and FIG. 11(b) are respectively a diagram showing a pickup apparatus of an infinite system and a diagram showing a pickup apparatus of a finite system.
Figure 11:
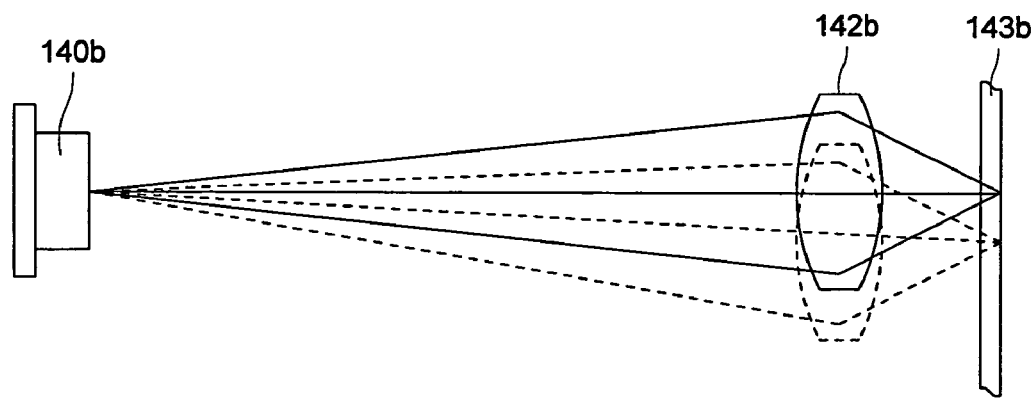

FIG. 11(a) is an illustration of an infinite system pickup apparatus (light entering an objective lens is collimated) and FIG. 11(b) is an illustration of a finite system pickup apparatus (light entering an objective lens is divergent). In the case of the infinite system pickup apparatus shown in FIG. 11(a), divergent light emitted from beam source 140 is collimated by collimator lens 141, then, is converged by objective lens 142 to be converged light to form a spot on a image recording surface of optical recording medium 143. In the case of the infinite system, even when objective lens 142 is in a neutral position, a collimated light flux enters an objective lens frontally and correctly in spite of tracking shift. Namely, even when the objective lens conducts tracking operations, aberration at least on the objective lens is not generated because an image point is constantly on the optical axis. If sine conditions are further satisfied also by the collimator lens, an amount of astigmatism generated is extremely small as shown in FIG. 11(a), even when an object point is deviated from the optical axis by track shifting.

Therefore, in the infinite system optical pickup apparatus the sine conditions have only to be corrected to the level that is not problematic in terms of manufacturing tolerance, because aberration on the objective lens is not generated in principle. However, if an angle of installation of an objective lens is deviated, oblique light entering takes place even in the case of the infinite system, in which, therefore, sine conditions need to be satisfied to the level where large aberration is not generated.

On the other hand, in the case of the finite pickup apparatus shown in FIG. 11(b), divergent light emitted from beam source 140b enters objective lens 142b to form a spot on a recording surface of optical recording medium 143b. In the finite system, when objective lens 142b is in a neutral position, aberration is not generated because divergent light enters the light frontally-and correctly, but, when the objective lens 142b is shifted for tracking, an object point (namely, beam source 140b) turns out to be off-axis to be the same in terms of the state as in FIG. 11(b).

In this case, if sine conditions are sufficiently satisfied by objective lens 142b, astigmatism generated is slight as shown in FIG. 10(a), resulting in no problem, but if the sine conditions are not satisfied, coma is generated greatly as shown in FIG. 10(b), and a profile of a spot is blurred to make reproducing difficult. In other words, in the finite system optical pickup apparatus, the objective lens needs to satisfy sine conditions sufficiently, and it is necessary to select an aspheric surface constant of the objective lens so that it satisfies the sine conditions.

Taking a difference between the aforesaid infinite system and the finite system into consideration, in the conventional DVD-CD compatible optical pickup apparatus, when reproducing DVD, an objective lens was designed so that sine conditions are not satisfied, and reproducing has been conducted on the infinite system basis, while, when reproducing less-density recording medium CD, an objective lens was designed so that sine conditions are satisfied, and reproducing has been on the finite system basis.

The reason why the objective lens is designed to deviate from sine conditions in the infinite system and the objective lens is designed to satisfy the sine conditions in the finite system is that the deviation from the sine conditions is not problematic substantially (namely, sine conditions do not need to be satisfied) in the structure of infinite system because aberration is not generated by tracking shift in principle.

Therefore, if the objective lens is designed as stated above, large aberration is not generated by tracking shift even for reproducing both records respectively, and reproduced signals can be obtained.

Figure 12:
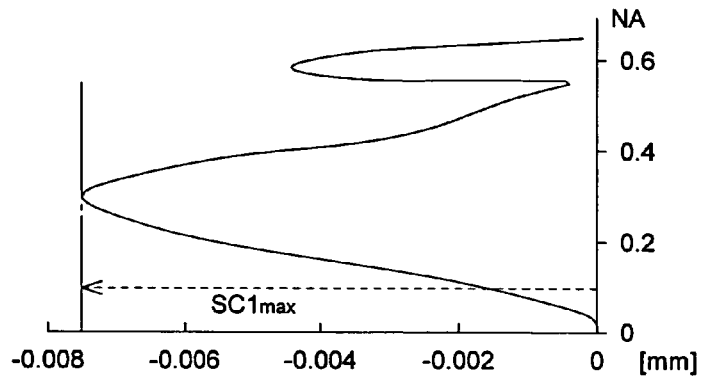
-FIG. 12(c) is a graph showing an amount of offense against sine conditions.
Figure 12:
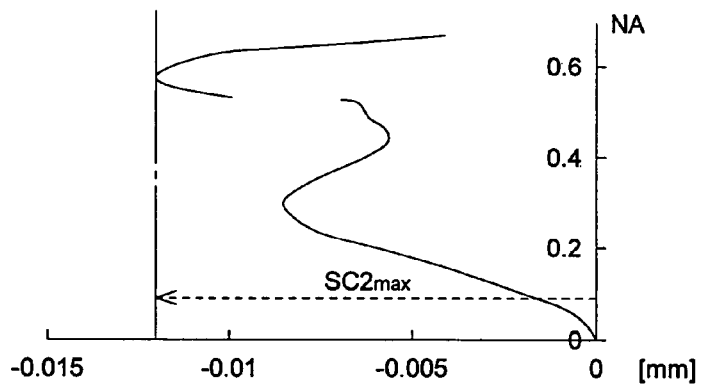
Figure 12:
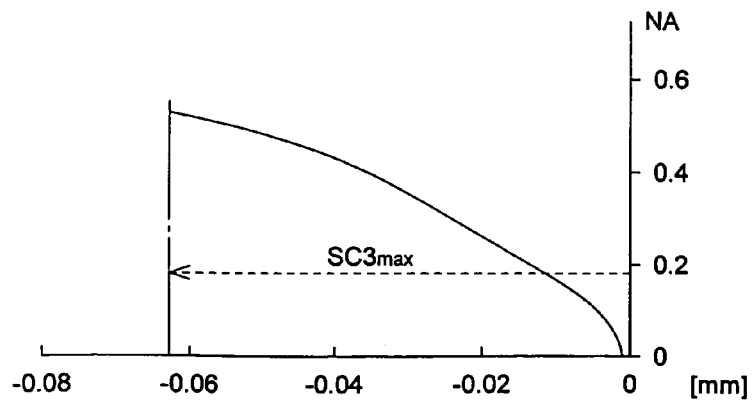

Each of FIGS. 12(a)-12(c) is a graph showing an amount of offence against the sine condition for using respectively HD, DVD and CD.

When the maximum values of amounts of offence against the sine condition respectively for HD and CD are prescribed to be SC1max and SC3max, if a value of |SC1max/SC3max| is smaller than the lower limit of expression (2), an amount of offence against the sine condition on the edge portion in an effective diameter of a light flux with wavelength λ3 exceeds 0.07 in terms of an absolute value, and coma of a converging optical element having a short focal length, in particular, coma of an objective lens in the case of tracking may exceed Marechal's criterion. On the other hand, if the aforesaid value is greater than the upper limit of the expression (2), the maximum value of an absolute value of an amount of offence against the sine condition in the case of using a light flux with wavelength λ1 grows too great, and off-axis characteristics for HD are worsened.

By making a value of |SC1max/SC3max| to be within a range of the expression (2), it is possible to make an amount of coma generated in tracking when using on a finite basis to be Marechal's criterion or less, while securing off-axis characteristics of HD sufficiently, even when a focal length is sufficiently small.

Further, the establishment is made to satisfy expression (3) when 1Rr1 represents a radius of curvature for the first area, 1Rr2 represents a radius of curvature for the second area, 2Rr1 represents a radius of curvature for the third area and 2Rr2 represents a radius of curvature for the fourth area.

$$0.5 < (1Rr2 - 2Rr2)/(1Rr1 - 2Rr1) < 1.5 \qquad (3)$$

The expression (3) shows that curvature radius (1Rr1 and 2Rr1) inside of a range which is not less than the lower limit 0.5 are different each other, and that curvature radius (1Rr2 and 2Rr2) on the outside are different each other, both concerning an objective lens with a short focal length than the lower limit. When the lower limit 0.5 is higher, it means that a paraxial radius on an outside area of at least one side of light source side and an optical disc side of the objective lens is small, and when the paraxial radius becomes smaller, off-axis characteristics and influences of eccentricity errors grow greater.

Incidentally, let it be assumed that 1 is not included in a range of the expression (3). The reason for the foregoing is that the radius of curvature of the paraxial axis on the inside area needs to be different from that of the paraxial axis on the outside area when coma is corrected by the technology of the invention.

As stated above, by making (1Rr2−2Rr2)/(1Rr1−2Rr1) to be within a range of the expression (3), it is possible to prescribe a surface form of an optical surface of an objective lens capable of correcting off-axis aberration, while correcting spherical aberration for three types of wavelengths. Owing to this, it is possible to prevent that a radius of curvature of an aspheric surface in an inside area is remarkably different from that in an outside area.

If the radius of curvature of the paraxial axis on the outside area is small, there is generated aberration on the occasion where shift of relative surface takes place in an injection molding manufacturing. However, if this range is kept, it is possible to make an objective lens to be one wherein an amount of generation of aberration is sufficiently controlled.

When SCmax represents an amount of offence against the sine condition on the edge of an effective diameter of the objective lens in a finite conjugated system in the case of conducting recording and reproducing of information for CD, a converging optical element is established to satisfy expression (4).

$$0.03 < |SC\ max|/f < 0.05 \quad (4)$$

When focal length f is large, or when an absolute value of SCmax is small, |SCmax| is smaller than the lower limit value 0.03, and it is preferable that a focal length of an objective lens is about 1.8 mm-2.3 mm, especially about 1.8 mm-2.0 mm when the objective lens is incorporated in a thin type pickup apparatus. Further, if SCmax in the finite system is controlled to be small, the sine conditions for other optical discs (HD and DVD) are not satisfied, resulting in a fear that compatibility for three types of optical discs may not be attained.

Further, when focal length f is small or when SCmax is large, |SCmax| is larger than the upper limit value 0.05, and if the focal length is too small (for example, f=1.6 or less), a sufficient working distance cannot be secured, and if SCmax is too large, coma in the case of lens shift in the finite conjugate system cannot be controlled, which are troubles.

To achieve a structure of a slim type optical pickup apparatus, it is desirable to use an objective lens having focal length f of 1.8-2.3 mm, especially is desirable to use an objective lens having focal length f of 1.8-2.0 mm, and to control generation of coma in the case of lens shift in the finite conjugate system, it is necessary to make SCmax small by controlling an amount of offence against the sine condition as the focal length grows shorter. The expression (4) shows relationship between focal length f and |SCmax|, and if an amount of offence against the sine condition is within a numerical value range of the expression (4), it is possible to obtain an objective lens for a thin type optical pickup apparatus which can be used for conducting recording and reproducing of information for three wavelength types and is ensured in terms of off-axis characteristics.

Incidentally, though the finite conjugate system is used for conducting recording and reproducing of information for CD in the present embodiment, it is also possible to use the finite conjugate system for HD, DVD or for all of HD, DVD and CD.

Further, as an aperture element for conducting aperture limitation that corresponds to NA3, it is also possible to employ the structure wherein aperture limiting element AP is arranged in the vicinity of optical surface S1 of objective lens OBJ, and a biaxial actuator drives both the aperture limiting element AP and the objective lens OBJ solidly for tracking.

On the optical surface of the aperture limiting element AP in this case, there is formed wavelength-selecting filter WF having wavelength-selectivity of transmittance. Since this wavelength-selecting filter WF has wavelength-selectivity of transmittance that transmits all wavelengths from the first wavelength λ1 to the third wavelength λ3 in the area within NA3, and intercepts only the third wavelength λ3 and transmits the first wavelength λ1 and the second wavelength λ2, in the area from NA3 to NA1, the aperture corresponding to NA3 can be limited by the wavelength-selectivity.

A method for limiting an aperture includes not only a method to use the wavelength-selecting filter WF but also a method to change an aperture mechanically and a method to use liquid crystal phase control element LCD which will be described later.

With respect to a material of objective lens OBJ, plastic is preferable from the viewpoint of a lightweight and low cost lens, but glass may also be used when temperature resistance and lightfastness are taken into consideration. Though a refraction type glass mold aspheric lens is mainly available on the market presently, a glass mold lens on which a diffractive structure is provided can be manufactured if low-melting glass under development is used. Further, in development of plastic for optical application, there is available a material of plastic for optical application wherein a change of refractive index for temperature change is small. This is one to make a change of refractive index of total resin caused by temperature change to be small, by mixing inorganic fine particles having a change of refractive index by temperature with a certain sign and those having a change of refractive index by temperature with an opposite sign. In addition, there is further a material wherein dispersion of total resin is made small by mixing inorganic fine particles having small dispersion in the same way. If the aforesaid materials are used in the objective lens for BD, more effects are expected.

EXAMPLES

Next, an example of the optical element shown in the aforesaid embodiment will be explained.

Table 1 shows lens data of Example 1.

TABLE 1

| | Example 1 Lens data | | | | | |
|---|---|---|---|---|---|---|
| | Focal length of objective lens | | | | | |
| | $f_1 = 2.0$ mm | | $f_2 = 2.06$ mm | | $f_3 = 2.04$ mm | |
| Numerical aperture on the image side | NA1: 0.65 | | NA2: 0.65 | | NA3: 0.51 | |
| 2nd surface diffraction order number | n1: 3 | | n2: 2 | | n3: 2 | |
| 2'nd surface diffraction order number | n1: 3 | | n2: 2 | | | |
| Magnification | m1: 0 | | m2: 0 | | m3: −1/17.8 | |
| $i^{th}$ surface | ri | di (407 nm) | ni (407 nm) | di (655 nm) | ni (655 nm) | di (785 nm) | ni (785 nm) |
| 0 | | ∞ | | ∞ | | 38.1 | |
| 1 | ∞ | 0.01 | | 0.01 | | 0.01 | |

TABLE 1-continued

| *1 | | (φ2.60 mm) | | (φ2.68 mm) | | (φ1.92 mm) | |
|---|---|---|---|---|---|---|---|
| 2 | 1.34018 | 1.17 | 1.55981 | 1.17 | 1.54073 | 1.17 | 1.53724 |
| 2' | 1.31096 | 0.00122 | 1.55981 | 0.00122 | 1.54073 | 0.00122 | 1.53724 |
| 3 | −7.10479 | 0.96 | 1.0 | 1.00 | 1.0 | 0.71 | 1.0 |
| 3' | −7.26627 | 0.00000 | 1.0 | 0.00000 | 1.0 | 0.00000 | 1.0 |
| 4 | ∞ | 0.6 | 1.61869 | 0.6 | 1.57752 | 1.2 | 1.57063 |
| 5 | ∞ | | | | | | |

*1: (Aperture diameter)
* The symbol di represents a displacement from the $i^{th}$ surface to the $(i+1)^{th}$ surface.
* The symbols d2' and d3' represent respectively a displacement from the $2^{nd}$ surface to the $2^{nd}$ surface and a displacement from the $3^{rd}$ surface to the $3^{rd}$ surface.

Aspheric surface data
2nd surface (0 < h ≦ 1.09 mm: HD DVD/DVD/CD common area)

| Aspheric surface coefficient | |
|---|---|
| κ | −5.9999 × E−1 |
| A4 | +1.0790 × E−3 |
| A6 | −9.0067 × E−3 |
| A8 | +1.7421 × E−2 |
| A10 | +1.4568 × E−3 |
| A12 | −1.1364 × E−2 |
| A14 | +3.4077 × E−3 |
| Optical path difference function | |
| B2 | −1.2267 × E+1 |
| B4 | −1.1046 × E−1 |
| B6 | −7.0887 |
| B8 | +6.0938 |
| B10 | −1.8741 |

$2^{nd}$ surface (1.09 mm < h: HD DVD/DVD common area)

| Aspheric surface coefficient | |
|---|---|
| κ | −5.5438 × E−1 |
| A4 | −9.4122 × E−3 |
| A6 | −1.5087 × E−2 |
| A8 | +2.8617 × E−2 |
| A10 | +2.4236 × E−2 |
| A12 | −1.1323 × E−2 |
| A14 | −2.4337 × E−3 |
| Optical path difference function | |
| B2 | −1.2267 × E+1 |
| B4 | −4.3941 |
| B6 | +2.9942 |
| B8 | −2.0690 |
| B10 | +3.2891 × E−1 |

$3^{rd}$ surface (0 < h ≦ 0.87 mm: HD DVD/DVD/CD common area)
Aspheric surface coefficient

| | |
|---|---|
| κ | −1.6059 × E+2 |
| A4 | −5.0210 × E−2 |
| A6 | +1.7136 × E−1 |
| A8 | −1.2503 × E−1 |
| A10 | −1.3210 × E−1 |
| A12 | +1.9329 × E−1 |
| A14 | −2.7118 × E−2 |
| A16 | −3.1989 × E−2 |

$3^{rd}$ surface (0.87 mm < h: HD DVD/DVD common area)
spheric surface coefficient

| | |
|---|---|
| κ | −2.0000 × E+2 |
| A4 | +1.1834 × E−2 |
| A6 | −5.7758 × E−2 |
| A8 | +5.7275 × E−2 |
| A10 | +2.3071 × E−2 |
| A12 | −6.4775 × E−2 |
| A14 | +3.5153 × E−2 |
| A16 | −6.3388 × E−3 |

As shown in Table 1, a converging optical element of the invention is applied to an objective lens in the present example.

The objective lens in the present example is compatible for HD, DVD and CD, and focal length f1 is set to 2.0 mm and magnification m1 is set to 0 for HD, focal length f2 is set to 2.06 mm and magnification m2 is set to 0 for DVD, and focal length f3 is set to 2.04 mm and magnification m3 is set to −1/17.8 for CD.

A plane of incidence (optical surface facing the light source side) of the objective lens is divided into first area AREA1 (second surface) which is within a range of 0<h≦1.09 mm in terms of height h from the optical axis and corresponds to an area within NA3 and second area AREA2 ($2^{\prime nd}$ surface) which is within a range of 1.09 mm and corresponds to an area from NA3 to NA1. On each of the first area AREA1 and the second area AREA2, there is formed diffractive structure DOE which is composed of plural ring-shaped zones in a form of concentric circles each having its center on an optical axis, and is in a form of a serration in terms of a section including an optical axis.

A plane of emergence (optical surface facing the optical disc side) of the objective lens is divided into third area AREA3 (third surface) which is within a range of 0<h≦0.87 mm in terms of height h from the optical axis and corresponds to an area within NA3 and fourth area AREA4 ($3^{\prime rd}$ surface) which is within a range of 0.87 mm<h and corresponds to an area from NA3 to NA1.

Each of the second surface, the $2^{\prime nd}$ surface, the third surface and the $3^{\prime rd}$ surface is formed to be an aspheric surface that is prescribed by a numerical expression wherein a coefficient shown in Table 1 is substituted in the following expression Numeral 1, and is axially symmetrical around optical axis L.

$$x = \frac{h^2/r}{1 + \sqrt{1 - (1+\kappa)(h/r)^2}} + \sum_{i=2} A_{2i} h^{2i} \quad \text{(Numeral 1)}$$

In the expression above, x represents an axis in the direction of the optical axis (the direction of travel of light is assumed to be positive), κ represents a conic constant and $A_{2i}$ represents an aspheric surface coefficient. Diffractive structure DOE on each of the second surface and the $2^{\prime nd}$ surface is expressed by an optical path difference which is added by this diffractive structure to a transmission wavefront. The optical path difference of this kind is expressed by optical path difference function φ (h) (mm) defined by substituting a coefficient shown in Table 1 in the following Numeral 2, when h (mm) represents a height in the direction perpendicular to an optical axis, $B_{2i}$ represents an optical path difference function coefficient, n represents a diffraction order number of diffracted light having the maximum diffraction efficiency among diffracted rays of an incident light flux, λ (nm) represents a wavelength of a light flux entering the diffractive structure and λB (nm) represents a manufacture wavelength of the diffractive structure.

Incidentally, blaze wavelength λB of the diffractive structure DOE is 1.0 mm.

$$\Phi(h) = \left(\sum_{i=1}^{5} B_{2i} h^{2i}\right) \times n \times \lambda / \lambda B \quad \text{(Numeral 2)}$$

Optical Path difference function
Table 2 shows lens data of Example 2.

TABLE 2

Example 2 Lens data

| | | Focal length of objective lens | | |
|---|---|---|---|---|
| | | $f_1$ = 1.80 mm | $f_2$ = 1.85 mm | $f_3$ = 1.84 mm |
| Numerical aperture on the image side | | NA1: 0.65 | NA2: 0.65 | NA3: 0.51 |
| 2nd surface diffraction order number | | n1: 3 | n2: 2 | n3: 2 |
| 2'nd surface diffraction order number | | n1: 3 | n2: 2 | |
| Magnification | | m1: 0 | m2: 0 | m3: −1/15.2 |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | 29.6 | |
| 1 | ∞ | 0.01 | | 0.01 | | 0.01 | |
| *1 | | (φ2.34 mm) | | (φ2.41 mm) | | (φ1.88 mm) | |
| 2 | 1.22422 | 1.17 | 1.55981 | 1.17 | 1.54073 | 1.17 | 1.53724 |
| 2' | 1.26611 | 0.00351 | 1.55981 | 0.00351 | 1.54073 | 0.00351 | 1.53724 |
| 3 | −5.19902 | 0.77 | 1.0 | 0.80 | 1.0 | 0.53 | 1.0 |
| 3' | −3.31147 | 0.00000 | 1.0 | 0.00000 | 1.0 | 0.00000 | 1.0 |
| 4 | ∞ | 0.6 | 1.61869 | 0.6 | 1.57752 | 1.2 | 1.57063 |
| 5 | ∞ | | | | | | |

*1: (Aperture diameter)
* The symbol di represents a displacement from the $i^{th}$ surface to the $(i+1)^{th}$ surface.
* The symbols d2' and d3' represent respectively a displacement from the $2^{nd}$ surface to the $2^{\prime nd}$ surface and a displacement from the $3^{rd}$ surface to the $3^{\prime rd}$ surface.

TABLE 2-continued

Aspheric surface data
2nd surface (0 < h ≦ 1.01 mm: HD DVD/DVD/CD common area)

Aspheric surface coefficient

| | |
|---|---|
| κ | −5.6986 × E−1 |
| A4 | +2.4664 × E−3 |
| A6 | −1.0652 × E−2 |
| A8 | +1.7282 × E−2 |
| A10 | +3.2830 × E−3 |
| A12 | −1.7580 × E−2 |
| A14 | +6.3078 × E−3 |

Optical path difference function

| | |
|---|---|
| B2 | −1.2267 × E+1 |
| B4 | −9.2504 × E−1 |
| B6 | −7.9210 |
| B8 | +7.9487 |
| B10 | −3.1583 |

$2^{nd}$ surface (1.01 mm < h: HD DVD/DVD common area)

Aspheric surface coefficient

| | |
|---|---|
| κ | −4.6245 × E−1 |
| A4 | +1.1558 × E−2 |
| A6 | −1.1317 × E−2 |
| A8 | +2.4075 × E−2 |
| A10 | −2.7640 × E−2 |
| A12 | +1.0557 × E−2 |
| A14 | −1.8418 × E−3 |

Optical path difference function

| | |
|---|---|
| B2 | −1.2267E+1 |
| B4 | −4.8219 |
| B6 | +2.8386 |
| B8 | −2.3680 |
| B10 | +2.9605 × E−1 |

$3^{rd}$ surface (0 < h ≦ 0.775 mm: HD DVD/DVD/CD common area)
Aspheric surface coefficient

| | |
|---|---|
| κ | −7.3912 × E+1 |
| A4 | −2.1557 × E−2 |
| A6 | +1.6310 × E−1 |
| A8 | −2.0506 × E−1 |
| A10 | −1.2079 × E−1 |
| A12 | +4.0523 × E−1 |
| A14 | −2.0895 × E−1 |
| A16 | −1.7327 × E−2 |

$3^{rd}$ surface (0.775 mm < h: HD DVD/DVD common area)
Aspheric surface coefficient

| | |
|---|---|
| κ | −2.3793 × E+2 |
| A4 | +7.0966 × E−3 |
| A6 | −4.1298 × E−2 |
| A8 | +4.5005 × E−2 |
| A10 | +1.0140 × E−2 |
| A12 | −6.3910 × E−2 |
| A14 | +4.9454 × E−2 |
| A16 | −1.2399 × E−2 |

As shown in Table 2, a converging optical element of the invention is applied to an objective lens in the present example.

The objective lens in the present example is compatible for HD, DVD and CD, and focal length f1 is set to 1.80 mm and magnification m1 is set to 0 for HD, focal length f2 is set to 1.85 mm and magnification m2 is set to 0 for DVD, and focal length f3 is set to 1.84 mm and magnification m3 is set to −1/15.2 for CD.

A plane of incidence (optical surface facing the light source side) of the objective lens is divided into first area AREA1 (second surface) which is within a range of 0<h≦1.01 mm in terms of height h from the optical axis and corresponds to an area within NA3 and second area AREA2 ($2^{nd}$ surface) which is within a range of 1.01 mm<h and corresponds to an area from NA3 to NA1. On each of the first area AREA1 and the second area AREA2, there is formed diffractive structure DOE which is composed of plural ring-shaped zones in a form of concentric circles each having its center on an optical axis, and is in a form of a serration in terms of a section including an optical axis.

A plane of emergence (optical surface facing the optical disc side) of the objective lens is divided into third area AREA3 (third surface) which is within a range of 0<h≦0.775 mm in terms of height h from the optical axis and corresponds to an area within NA3 and fourth area AREA4 ($3'^{rd}$ surface) which is within a range of 0.775 mm<h and corresponds to an area from NA3 to NA1.

Each of the second surface, the $2'^{nd}$ surface, the third surface and the $3'^{rd}$ surface is formed to be an aspheric surface that is prescribed by a numerical expression wherein a coefficient shown in Table 2 is substituted in the Numeral 1 above, and is axially symmetrical around optical axis L.

Diffractive structure DOE on each of the second surface and the $2'^{nd}$ surface is expressed by an optical path difference which is added by this diffractive structure to a transmission wavefront. The optical path difference of this kind is expressed by optical path difference function $\phi$ (h) (mm) defined by substituting a coefficient shown in Table 2 in the Numeral 2 above.

Incidentally, blaze wavelength $\lambda B$ of the diffractive structure DOE is 1.0 mm.

Table 3 shows lens data of Example 3.

TABLE 3

Example 3 Lens data

| | Focal length of objective lens | | |
|---|---|---|---|
| | $f_1$ = 2.30 mm | $f_2$ = 2.36 mm | $f_3$ = 2.34 mm |
| Numerical aperture on the image side | NA1: 0.65 | NA2: 0.65 | NA3: 0.51 |
| 2nd surface diffraction order number | n1: 3 | n2: 2 | n3: 2 |
| 2'nd surface diffraction order number | n1: 3 | n2: 2 | |
| Magnification | m1: 0 | m2: 0 | m3: −1/20 |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | 48.8 | |
| 1 | ∞ | 0.01 | | 0.01 | | 0.01 | |
| *1 | | ($\phi$2.990 mm) | | ($\phi$3.069 mm) | | ($\phi$2.497 mm) | |
| 2 | 1.5520 | 1.4000 | 1.55981 | 1.4000 | 1.54073 | 1.4000 | 1.53724 |
| 2' | 1.5451 | −0.0024 | 1.55981 | −0.0024 | 1.54073 | −0.0024 | 1.53724 |
| 3 | −8.2397 | 1.1229 | 1.0 | 1.1646 | 1.0 | 0.8749 | 1.0 |
| 4 | ∞ | 0.6 | 1.61869 | 0.6 | 1.57752 | 1.2 | 1.57063 |
| 5 | ∞ | | | | | | |

*1: (Aperture diameter)
* The symbol di represents a displacement from the $i^{th}$ surface to the $(i + 1)^{th}$ surface.
* The symbol d2' represents a displacement from the $2^{nd}$ surface to the $2'^{nd}$ surface.

Aspheric surface data
2nd surface (0 < h ≤ 1.272 mm: HD DVD/DVD/CD common area)

| Aspheric surface coefficient | |
|---|---|
| κ | −2.4802E−01 |
| A4 | −1.0368E−02 |
| A6 | −3.5652E−03 |
| A8 | 1.6302E−03 |
| A10 | −1.1067E−03 |
| A12 | 1.6921E−04 |
| A14 | −9.7068E−05 |

| Optical path difference function | |
|---|---|
| B2 | −1.2267E+01 |
| B4 | −1.0085E+00 |
| B6 | −1.4478E+00 |
| B8 | 6.6731E−01 |
| B10 | −1.4060E−01 |

$2'^{nd}$ surface (1.272 mm < h: HD DVD/DVD common area)

| Aspheric surface coefficient | |
|---|---|
| κ | −2.4458E−01 |
| A4 | −8.6225E−03 |
| A6 | −6.1327E−03 |
| A8 | 3.4373E−03 |
| A10 | −2.7396E−03 |
| A12 | 9.5412E−04 |
| A14 | −2.3741E−04 |

TABLE 3-continued

Optical path difference function

| | |
|---|---|
| B2 | −1.2566E+01 |
| B4 | −6.5714E−01 |
| B6 | −1.4136E+00 |
| B8 | 5.2675E−01 |
| B10 | −1.0405E−01 |

$3^{rd}$ surface
Aspheric surface coefficient

| | |
|---|---|
| κ | −5.0000E+00 |
| A4 | 1.5346E−02 |
| A6 | 3.0181E−02 |
| A8 | −4.2087E−02 |
| A10 | 2.3341E−02 |
| A12 | −6.6328E−03 |
| A14 | 8.0143E−04 |

As shown in Table 3, a converging optical element of the invention is applied to an objective lens in the present example.

The objective lens in the present example is compatible for HD, DVD and CD, and focal length f1 is set to 2.30 mm and magnification m1 is set to 0 for HD, focal length f2 is set to 2.36 mm and magnification m2 is set to 0 for DVD, and focal length f3 is set to 2.34 mm and magnification m3 is set to −1/20 for CD.

A plane of incidence (optical surface facing the light source side) of the objective lens is divided into first area AREA1 (second surface) which is within a range of 0<h≦1.272 mm in terms of height h from the optical axis and corresponds to an area within NA3 and second area AREA2 ($2^{'nd}$ surface) which is within a range of 1.272 mm<h and corresponds to an area from NA3 to NA1. On each of the first area AREA1 and the second area AREA2, there is formed diffractive structure DOE which is composed of plural ring-shaped zones in a form of concentric circles each having its center on an optical axis, and is in a form of a serration in terms of a section including an optical axis.

A plane of emergence (optical surface facing the optical disc side) of the objective lens is provided with third area AREA3 (third surface) corresponds to an area within NA3.

Each of the second surface, the $2^{'nd}$ surface and the third surface is formed to be an aspheric surface that is prescribed by a numerical expression wherein a coefficient shown in Table 3 is substituted in the Numeral 1 above, and is axially symmetrical around optical axis L.

Diffractive structure DOE on each of the second surface and the $2^{'nd}$ surface is expressed by an optical path difference which is added by this diffractive structure to a transmission wavefront. The optical path difference of this kind is expressed by optical path difference function φ (h) (mm) defined by substituting a coefficient shown in Table 3 in the Numeral 2 above.

Incidentally, blaze wavelength λB of the diffractive structure DOE is 1.0 mm.

Table 4 shows lens data of Example 4.

TABLE 4

Example 4 Lens data

| | Focal length of objective lens | | |
|---|---|---|---|
| | $f_1$ = 2.30 mm | $f_2$ = 2.38 mm | $f_3$ = 2.41 mm |
| Numerical aperture on the image side | NA1: 0.65 | NA2: 0.65 | NA3: 0.5 |
| 2nd surface diffraction order number | n1: 3 | n2: 2 | n3: 2 |
| Magnification | m1: 0 | m2: 0 | m3: −1/26 |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | ∞ | | ∞ | | 64.7 | |
| 1 | ∞ | 0.01 | | 0.01 | | 0.01 | |
| *1 | | (φ2.990 mm) | | (φ3.069 mm) | | (φ2.497 mm) | |
| 2 | 1.4392 | 1.4000 | 1.55981 | 1.4000 | 1.54073 | 1.4000 | 1.53724 |
| 2' | 1.9293 | 0.2852 | 1.55981 | 0.2852 | 1.54073 | 0.2852 | 1.53724 |

TABLE 4-continued

| | | | | | | | |
|---|---|---|---|---|---|---|---|
| 3 | −6.5412 | 1.1483 | 1.0 | 1.2140 | 1.0 | 0.9498 | 1.0 |
| 4 | ∞ | 0.6 | 1.61869 | 0.6 | 1.57752 | 1.2 | 1.57063 |
| 5 | ∞ | | | | | | |

*1: (Aperture diameter)
* The symbol di represents a displacement from the $i^{th}$ surface to the $(i + 1)^{th}$ surface.
* The symbol d2' represent a displacement from the $2^{nd}$ surface to the $2^{md}$ surface.

Aspheric surface data
2nd surface (0 < h ≦ 1.496 mm: HD DVD/DVD/CD common area)

| Aspheric surface coefficient | |
|---|---|
| κ | −3.4237E−01 |
| A4 | −1.1974E−02 |
| A6 | −5.2822E−03 |
| A8 | 3.0046E−03 |
| A10 | −1.5325E−03 |
| A12 | 2.1957E−04 |
| A14 | −8.4256E−05 |
| Optical path difference function | |
| B2 | 4.3821E+00 |
| B4 | −2.9297E−01 |
| B6 | −1.8293E+00 |
| B8 | 8.9630E−01 |
| B10 | −1.8216E−01 |

$2^{md}$ surface (1.496 mm < h: DVD excusive area)
Aspheric surface coefficient

| | |
|---|---|
| κ | 3.4446E−01 |
| A4 | −6.8372E−02 |
| A6 | −2.8158E−02 |
| A8 | 1.5041E−02 |
| A10 | 7.6089E−03 |
| A12 | −1.5883E−03 |
| A14 | −5.4780E−04 |

$3^{rd}$ surface
Aspheric surface coefficient

| | |
|---|---|
| κ | 5.4841E−01 |
| A4 | 1.3559E−02 |
| A6 | 3.5243E−02 |
| A8 | −4.1234E−02 |
| A10 | 2.1535E−02 |
| A12 | −5.8432E−03 |
| A14 | 6.8990E−04 |

As shown in Table 4, a converging optical element of the invention is applied to an objective lens in the present example.

The objective lens in the present example is compatible for HD, DVD and CD, and focal length f1 is set to 2.30 mm and magnification m1 is set to 0 for HD, focal length f2 is set to 2.38 mm and magnification m2 is set to 0 for DVD, and focal length f3 is set to 2.41 mm and magnification m3 is set to −1/26 for CD.

A plane of incidence (optical surface facing the light source side) of the objective lens is divided into first area AREA1 (second surface) which is within a range of 0<h≦1.496 mm in terms of height h from the optical axis and corresponds to an area within NA3 and second area AREA2 ($2^{md}$ surface) which is within a range of 1.496 mm<h and corresponds to an area from NA3 to NA1. On each of the first area AREA1 and the second area AREA2, there is formed diffractive structure DOE which is composed of plural ring-shaped zones in a form of concentric circles each having its center on an optical axis, and is in a form of a serration in terms of a section including an optical axis.

A plane of emergence (optical surface facing the optical disc side) of the objective lens is provided with third area AREA3 (third surface) corresponds to an area within NA3.

Each of the second surface, the $2^{md}$ surface and the third surface is formed to be an aspheric surface that is prescribed by a numerical expression wherein a coefficient shown in Table 4 is substituted in the Numeral 1 above, and is axially symmetrical around optical axis L.

Diffractive structure DOE on each of the second surface is expressed by an optical path difference which is added by this diffractive structure to a transmission wavefront. The optical path difference of this kind is expressed by optical path difference function φ (h) (mm) defined by substituting a coefficient shown in Table 4 in the Numeral 2 above.

Incidentally, blaze wavelength λB of the diffractive structure DOE is 1.0 mm.

Figure 13:
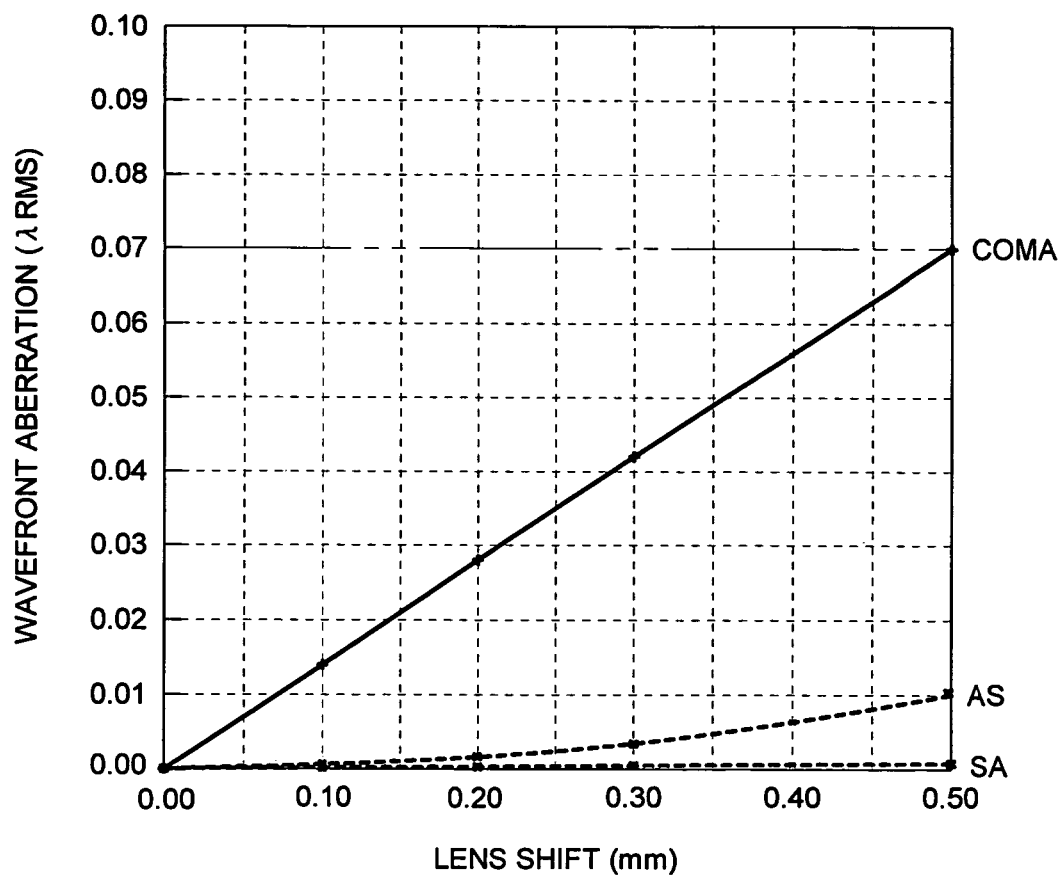
FIG. 13 is a graph showing an amount of wavefront aberration in the case of lens shift in Example 1.
Figure 14:
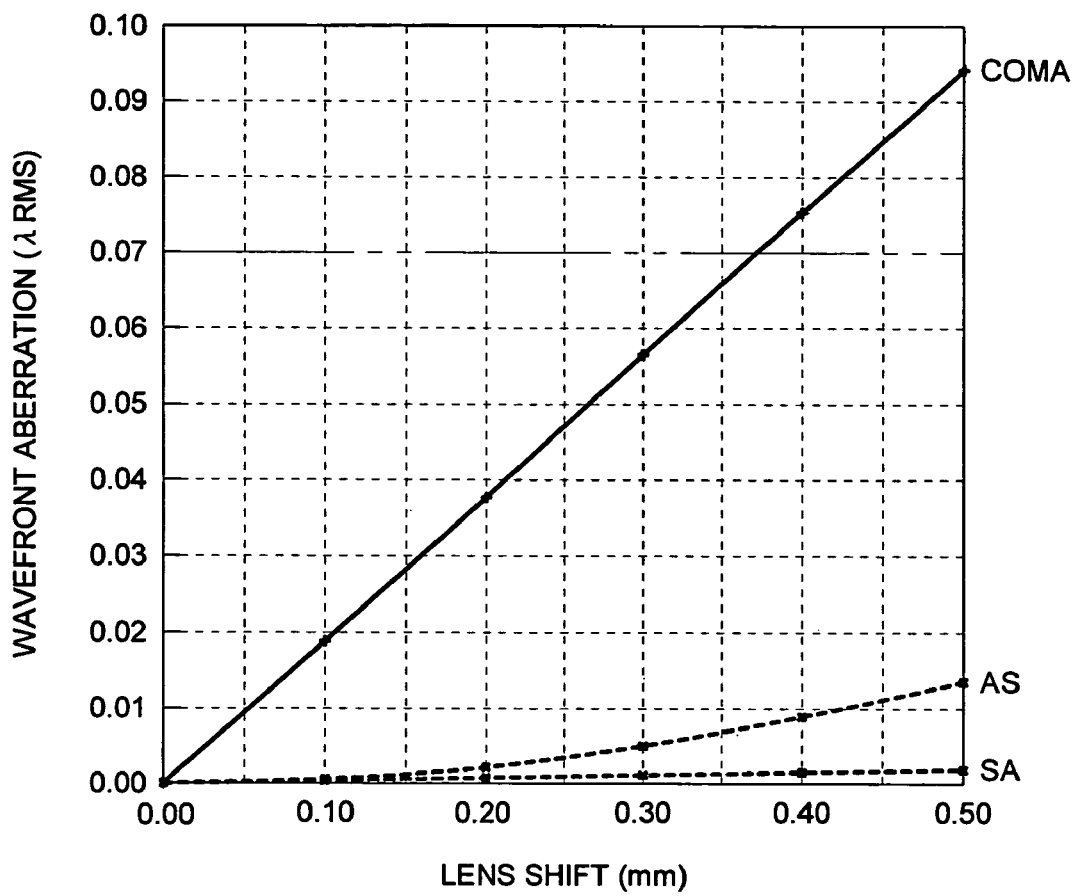
FIG. 14 is a graph showing an amount of wavefront aberration in the case of lens shift in Example 2.
Figure 15:
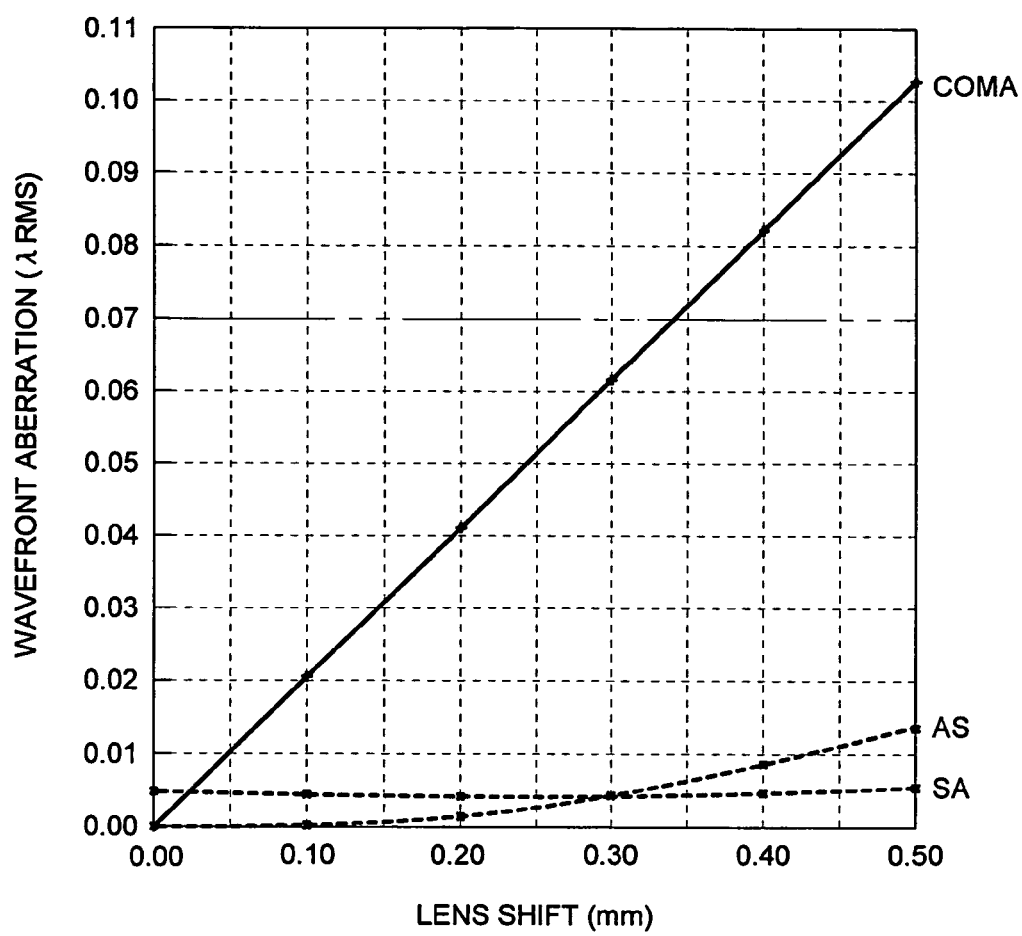
FIG. 15 is a graph showing an amount of wavefront aberration in the case of lens shift in Comparative Example.
Figure 16:
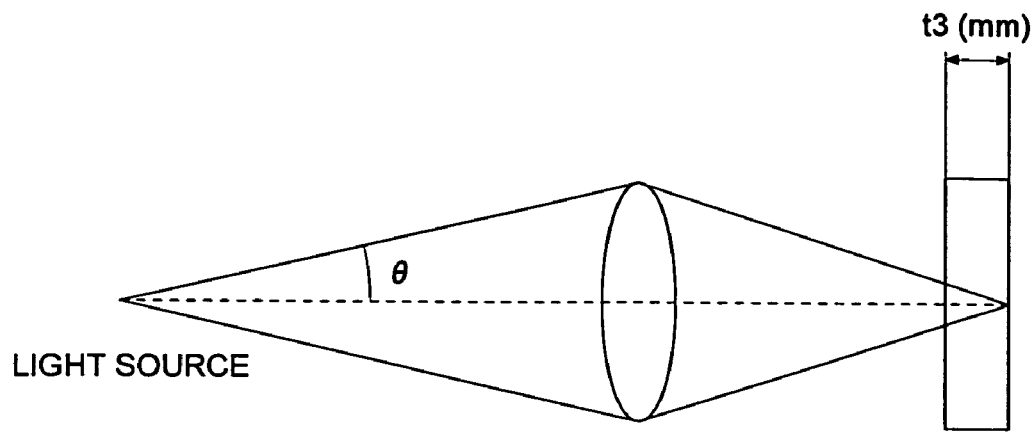
-FIG. 16(c) is a diagram for illustrating an optical system that is made smaller proportionally.
Figure 16:
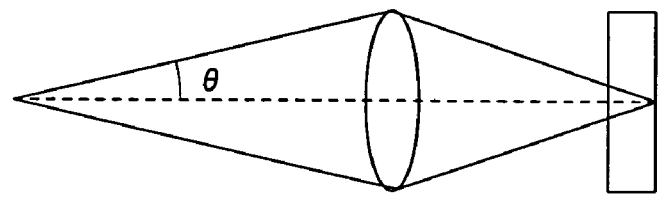
Figure 16:
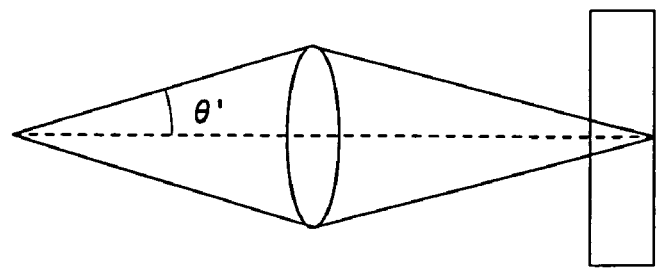
Figure 17:
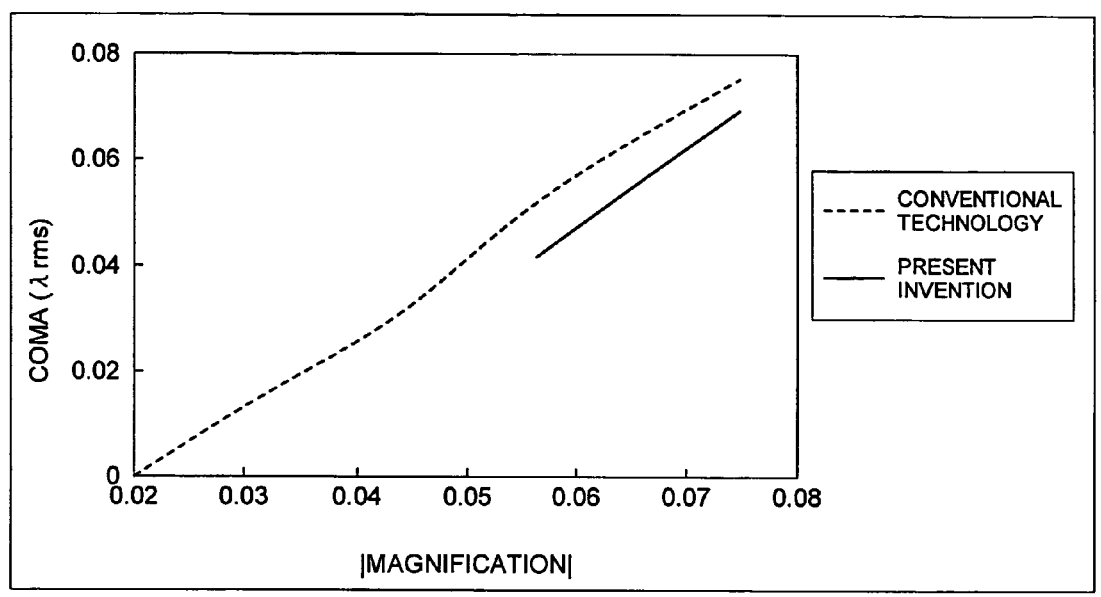
FIG. 17 is a graph showing the relationship between an amount of generation of third order coma caused in the course of tracking and a magnification.

Each of FIG. 13 and FIG. 14 is a graph showing an amount of generation of wavefront aberration in the case of generation of lens shift respectively in Example 1 and Example 2, and FIG. 15 is a graph showing, as a comparative example, an amount of generation of wavefront aberration in the case of generation of lens shift in the conventional objective lens (focal length f1=1.8 mm).

It is understood, from FIGS. 13-15, that Marechal's criterion 0.07 [λrms] is not exceeded on the objective lens (focal length f1=2.0 mm) in Example 1 and on the objective lens (focal length f1=1.8 mm) in Example 2, although Marechal's criterion 0.07 [λrms] is exceeded on the conventional objective lens.

It is also understood that, when the lens is shifted by 0.5 mm, it is preferable to use the objective lens in Example 1, from the viewpoint of controlling wavefront aberration in the case of lens shift, because Marechal's criterion 0.07 [λrms] is not exceeded by the objective lens (focal length f1=2.0 mm) in Example 1.

While the preferred embodiments of the present invention have been described using specific terms, such description is for illustrative purposes only, and it is to be understood that changes and variations may be made without departing from the sprit or scope of the appended claims.

What is claimed is:

1. A converging optical element for use in an optical pickup apparatus reproducing and/or recording information on a first optical disc having a protective substrate with a thickness t1 (mm) using a first light flux with a wavelength λ1 (nm) emitted by a first light source, reproducing and/or recording information on a second optical disc having a protective substrate with a thickness t2 (mm) using a second light flux with a wavelength λ2 (nm) emitted by a second light source, and reproducing and/or recording information on a third optical disc having a protective substrate with a thickness t3 (mm) using a third light flux with a wavelength λ3 (nm) emitted by a third light source, the converting optical element comprising:

a phase structure arranged on at least one surface of the converging optical element, wherein
the thicknesses t1, t2 and t3 satisfy t1 ≦t2 <t3,
when m3 is an optical system magnification of the converging optical element for an effective light flux which is necessary for recording or reproducing information on the third disc and f3 is a focal length of the converging optical element for the third light flux, the focal length f3 satisfies $0.01 < |m3| \times (t3-t1)/f3 < 0.03$, and the converging optical element satisfies $0.03 < |SC\,max|/f < 0.05$ where SCmax is an amount of an offence against sine condition on an edge of an effective diameter of the converging optical element when the pickup apparatus reproduces or records information on the third disc using a finite coniugated system, and f is a focal length of the converging optical system for a light flux emitted by one of the first to third light sources and passing through a position which is on a principal plane of the converging optical element and is located away from the optical axis by a distance H in a perpendicular direction to the optical axis.

2. The converging optical element of claim 1, wherein the converging optical element satisfies $0.05 \leq |SC1\,max/SC3\,max| \leq 0.25$ where u is an angle between an optical axis and a light flux emitted by one of the first-third light sources and passing through a position which is on a principal plane of the converging optical element and is located away from the optical axis by a distance H in a perpendicular direction to the optical axis, U is an angle between the optical axis and the light flux emitted from an optical surface facing an optical-disc side of the converging optical element, n is a refractive index of an object-side area of the converging optical element, n' is a refractive index of an image-side area of the converging optical element, m is an optical system magnification of the converging optical system for the light flux, f is a focal length of the converging optical system for the light flux, SC is an amount of an offence against sine condition and satisfies the following expressions, $SC = n \times H/n' \times \sin U - f$ for $m=0$, and $SC = f(1-1/m)(\sin u/\sin U - m)$ for $m \neq 0$, SC1max is a maximum value of the offence against sine condition for converging the first light flux on the first optical disc, and SC3max is a maximum value of the offence against sine condition for converging the third light flux on the first optical disc.

3. The converging optical element of claim 2, wherein the converging optical element satisfies the following expressions:

$0.5 \leq NA1 \leq 0.7$, $0.4 \leq NA3 \leq 0.64$, where NA1 is a numerical aperture of an image side of the converging optical element for the first light flux, and NA3 is a numerical aperture of an image side of the converging optical element for the third light flux.

4. The converging optical element of claim 1, wherein each of an optical surface facing a light-source side and an optical surface facing an optical-disc side of the converging optical element is divided into a plurality of areas which are arranged concentrically around the optical axis, the plurality of areas include
a first area being on the optical surface facing the light-source side and including an optical axis,
a second area arranged outside of the first area,
a third area being on the optical surface facing the optical-disc side and including an optical axis, and
a fourth area arranged outside of the third area, the first area and the third area transmit the first to third light fluxes for reproducing or recording information on the first to third optical discs respectively, the second area and the fourth area transmit the first and second light fluxes for reproducing or recording information on the first and second optical discs respectively, and the converging optical element satisfies $0.5 < (1Rr2 - 2Rr2)/(1Rr1 - 2Rr1) < 1.5$, where 1Rr1 is a curvature radius of the first area, 1Rr2 is a curvature radius of the second area, 2Rr1 is a curvature radius of the third area, and 2Rr2 is a curvature radius of the fourth area.

5. The converging optical element of claim 4, wherein a height h of the first area from the optical axis is a height of an effective light flux diameter which is necessary for forming a converged spot on an information recording surface on the third optical disc.

6. The converging optical element of claim 1, wherein the converging optical element is formed of a single lens.

7. The converging optical element of claim 1,
wherein the converging optical element satisfies 1.8≦f≦2.3,
wherein f (mm) is a focal length of the converging optical element for a light flux emitted by one of the first to third light sources.

8. The converging optical element of claim 7, wherein the converging optical element satisfies 1.8≦f≦2.0.

9. The converging optical element of claim 1, wherein the converging optical element satisfies 0.035≦|m3|≦0.066.

10. The converging optical element of claim 1, wherein the converging optical element satisfies the following expressions:

$$1.5 \times \lambda 1 \leq \lambda 2 \leq 1.7 \times \lambda 1,$$

$$1.8 \times \lambda 1 \leq \lambda 3 \leq 2.2 \times \lambda 1.$$

11. The converging optical element of claim 1, wherein the converging optical element satisfies the following expressions:

$$0.9 \times t1 \leq t2 \leq 1.1 \times t1,$$

$$1.9 \times t1 \leq t3 \leq 2.1 \times t1.$$

12. An optical pickup apparatus for information recording and/or reproducing comprising:
a first light source for emitting a first light flux with a wavelength λ1 (nm) for recording and/or reproducing information on a first optical disc having a protective substrate with a thickness t1 (mm);
a second light source for emitting a second light flux with a wavelength λ2 (nm) for recording and/or reproducing information on a second optical disc having a protective substrate with a thickness t2 (mm);
a third light source for emitting a third light flux with a wavelength λ3 (nm) for recording and/or reproducing information on a third optical disc having a protective substrate with a thickness t3 (mm); and
a converging optical element having a phase structure arranged on at least one surface of the converging optical element, for converging the first light flux, the second light flux and the third light flux on the first disc, the second disc and the third disc, respectively, wherein
the thicknesses t1, t2 and t3 satisfy t1≦t2<t3,
when m3 is an optical system magnification of the converging optical element for an effective light flux which is necessary for recording or reproducing information on the third disc and f3 is a focal length of the converging optical element for the third light flux, the focal length f3 satisfies $$0.01 < |m3| \times (t3-t1)/f3 < 0.03, \text{ and}$$

the optical pickup apparatus satisfies $$0.03 < |SC \max|/f < 0.05$$

where SCmax is an amount of an offence against sine condition on an edge of an effective diameter of the converging optical element when the pickup apparatus reproduces or records information on the third disc using a finite coniugated system, and f is a focal length of the converging optical system for a light flux emitted by one of the first to third light sources and passing through a position which is on a principal plane of the converging optical element and is located away from the optical axis by a distance H in a perpendicular direction to the optical axis.

13. The optical pickup apparatus of claim 12, wherein the optical pickup apparatus satisfies $$0.05 < |SC1 \max/SC3 \max| < 0.25$$

where u is an angle between an optical axis and a light flux emitted by one of the first third light sources and passing through a position which is on a principal plane of the converging optical element and is located away from the optical axis by a distance H in a perpendicular direction to the optical axis,
U is an angle between the optical axis and the light flux emitted from an optical surface facing an optical-disc side of the converging optical element,
n is a refractive index of an object-side area of the converging optical element,
n' is a refractive index of an image-side area of the converging optical element,
m is an optical system magnification of the converging optical system for the light flux,
f is a focal length of the converging optical system for the light flux,
SC is an amount of an offence against sine condition and satisfies the following expressions, $$SC = n \times H/n' \times \sin U - f \text{ for } m = 0, \text{ and}$$

$$SC = f(1-1/m)(\sin u/\sin U - m) \text{ for } m \neq 0,$$

SC1max is a maximum value of the offence against sine condition for converging the first light flux on the first optical disc, and
SC3max is a maximum value of the offence against sine condition for converging the third light flux on the first optical disc.

14. The optical pickup apparatus of claim 13, wherein the optical pickup apparatus satisfies the following expressions:

$$0.5 \leq NA1 \leq 0.7,$$

$$0.4 \leq NA3 \leq 0.64,$$

where NA1 is a numerical aperture of an image side of the converging optical element for the first light flux, and
NA3 is a numerical aperture of an image side of the converging optical element for the third light flux.

15. The optical pickup apparatus of claim 12, wherein
each of an optical surface facing a light-source side and an optical surface facing an optical-disc side of the converging optical element is divided into a plurality of areas which are arranged concentrically around the optical axis,
the plurality of areas include
a first area being on the optical surface facing the light-source side and including an optical axis,
a second area arranged outside of the first area,
a third area being on the optical surface facing the optical-disc side and including an optical axis, and
a fourth area arranged outside of the third area,
the first area and the third area transmit the first to third light fluxes for reproducing or recording information on the first to third optical discs respectively,
the second area and the fourth area transmit the first and second light fluxes for reproducing or recording information on the first and second optical discs respectively, and the converging optical element satisfies $$0.5 < (1Rr2 - 2Rr2)/(1Rr1 - 2Rr1) < 1.5,$$

where 1Rr1 is a curvature radius of the first area, 1Rr2 is a curvature radius of the second area, 2Rr1 is a curvature radius of the third area, and 2Rr2 is a curvature radius of the fourth area.

16. The optical pickup apparatus of claim 15, wherein a height h of the first area of the converging optical element from the optical axis is a height of an effective light flux diameter which is necessary for forming a converged spot on an information recording surface on the third optical disc.

17. The optical pickup apparatus of claim 12, wherein the converging optical element is formed of a single lens.

18. The optical pickup apparatus of claim 12, wherein the optical pickup apparatus satisfies $1.8 \leq f \leq 2.3$, wherein f (mm) is a focal length of the converging optical element for a light flux emitted by one of the first to third light sources.

19. The converging optical element of claim 12, wherein the optical pickup apparatus satisfies $1.8 \leq f \leq 2.0$.

20. The optical pickup apparatus of claim 12, wherein the optical pickup apparatus satisfies $0.03 \leq |m3| 0.066$.

21. The optical pickup apparatus of claim 12, wherein the optical pickup apparatus satisfies the following expressions:

$$1.5 \times \lambda 1 \leq \lambda 2 \leq 1.7 \times \lambda 1,$$

$$1.8 \times \lambda 1 \leq \lambda 3 \leq 2.2 \times \lambda 1.$$

22. The converging optical element of claim 12, wherein the optical pickup apparatus satisfies the following expressions:

$$0.9 \times t1 \leq t2 \leq 1.1 \times t1,$$

$$1.9 \times t1 \leq t3 \leq 2.1 \times t1.$$

* * * * *

UNITED STATES PATENT AND TRADEMARK OFFICE
CERTIFICATE OF CORRECTION

PATENT NO.        : 7,613,096 B2                                  Page 1 of 1
APPLICATION NO.   : 11/153391
DATED             : November 3, 2009
INVENTOR(S)       : Wachi It is certified that error appears in the above-identified patent and that said Letters Patent is hereby corrected as shown below:

Title Page;

(*) Notice: should read, Subject to any disclaimer, the term of this patent is extended or adjusted under 35 U.S.C. 154 (b) by 1157 days.

Claim 1, col. 31, line 26, "$\lambda I$" should read --$\lambda 1$--.

Claim 1, col. 31, line 54, "coniugated" should read --conjugated--.

Claim 2, col. 31, line 63, "$0.05 \leq |SC1\ max / SC3\ max| \leq 0.25$" should read --$0.05 < |SC1max / SC3max| < 0.25$--.

Claim 12, col. 33, line 64, "coniugated" should read --conjugated--.

Claim 13, col. 34, line 9, "first third" should read --first – third--.

Signed and Sealed this

Thirty-first Day of August, 2010

David J. Kappos
*Director of the United States Patent and Trademark Office*